(12) United States Patent
Stein et al.

(10) Patent No.: US 11,803,981 B2
(45) Date of Patent: Oct. 31, 2023

(54) VEHICLE ENVIRONMENT MODELING WITH CAMERAS

(71) Applicant: Mobileye Vision Technologies Ltd., Jerusalem (IL)

(72) Inventors: Gideon Stein, Jerusalem (IL); Itay Blumenthal, Jerusalem (IL); Nadav Shaag, Jerusalem (IL); Jeffrey Moskowitz, Jerusalem (IL); Natalie Carlebach, Ra'anana (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/613,617

(22) PCT Filed: May 29, 2020

(86) PCT No.: PCT/IB2020/000553
§ 371 (c)(1),
(2) Date: Nov. 23, 2021

(87) PCT Pub. No.: WO2020/240284
PCT Pub. Date: Dec. 3, 2020

(65) Prior Publication Data
US 2022/0237866 A1 Jul. 28, 2022

Related U.S. Application Data

(60) Provisional application No. 62/854,818, filed on May 30, 2019.

(51) Int. Cl.
*G06T 7/579* (2017.01)
*G06T 7/292* (2017.01)
(Continued)

(52) U.S. Cl.
CPC .............. *G06T 7/579* (2017.01); *B60R 1/22* (2022.01); *G06N 3/045* (2023.01); *G06T 3/0093* (2013.01);
(Continued)

(58) Field of Classification Search
CPC . G06T 2207/20084; G06T 2207/10016; G06T 2207/20081; G06T 2207/30252;
(Continued)

(56) References Cited

U.S. PATENT DOCUMENTS

2014/0198184 A1  7/2014  Stein et al.
2018/0099646 A1  4/2018  Karandikar et al.
(Continued)

FOREIGN PATENT DOCUMENTS

CN  114144809  3/2022
DE  112020002697  3/2022
(Continued)

OTHER PUBLICATIONS

Zhou, Tinghui, et al. "Unsupervised learning of depth and ego-motion from video." Proceedings of the IEEE conference on computer vision and pattern recognition. 2017 (Year: 2017).*
(Continued)

*Primary Examiner* — Xiao M Wu
*Assistant Examiner* — Scott E Sonners
(74) *Attorney, Agent, or Firm* — Schwegman Lundberg & Woessner, P.A.

(57) ABSTRACT

Various systems and methods for modeling a scene. A device for modeling a scene includes a hardware interface to obtain a time-ordered sequence of images representative of a scene, the time-ordered sequence including a plurality of images, one of the sequence of images being a current image, the scene captured by a monocular imaging system; and processing circuitry to: provide a data set to an artificial neural
(Continued)

network (ANN) to produce a three-dimensional structure of the scene, the data set including: a portion of the sequence of images, the portion of the sequence of images including the current image; and motion of a sensor that captured the sequence of images; and model the scene using the three-dimensional structure of the scene, wherein the three-dimensional structure is determined for both moving and fixed objects in the scene.

26 Claims, 23 Drawing Sheets

(51) Int. Cl.
| | | |
|---|---|---|
| H04N 13/25 | (2018.01) | |
| B60R 1/22 | (2022.01) | |
| G06V 10/774 | (2022.01) | |
| G06V 20/58 | (2022.01) | |
| G06V 10/82 | (2022.01) | |
| G06T 3/00 | (2006.01) | |
| G06T 17/05 | (2011.01) | |
| G06N 3/045 | (2023.01) | |
| G06V 10/25 | (2022.01) | |
| G06V 20/56 | (2022.01) | |
| G08G 1/16 | (2006.01) | |
| G06T 17/00 | (2006.01) | |

(52) U.S. Cl.
CPC .............. *G06T 7/292* (2017.01); *G06T 17/00* (2013.01); *G06T 17/05* (2013.01); *G06V 10/25* (2022.01); *G06V 10/7747* (2022.01); *G06V 10/82* (2022.01); *G06V 20/56* (2022.01); *G06V 20/58* (2022.01); *G08G 1/166* (2013.01); *H04N 13/25* (2018.05); *G06T 2200/04* (2013.01); *G06T 2200/08* (2013.01); *G06T 2207/10016* (2013.01); *G06T 2207/10021* (2013.01); *G06T 2207/20081* (2013.01); *G06T 2207/20084* (2013.01); *G06T 2207/30252* (2013.01); *G08G 1/165* (2013.01)

(58) Field of Classification Search
CPC ... G06T 2207/10028; G06T 7/73; G06T 7/50; G06T 7/55; G06T 2207/30244; G06T 7/20; G06T 7/70; G06T 17/00; G06T 2200/08; G06T 7/269; G06T 9/002; G06V 20/56; G06V 20/58; G06V 10/82; G06V 10/40; G06V 10/422
See application file for complete search history.

(56) References Cited

U.S. PATENT DOCUMENTS

| | | | |
|---|---|---|---|
| 2019/0147621 | A1 | 5/2019 | Alesiani et al. |
| 2020/0258249 | A1* | 8/2020 | Angelova ................. G06T 7/20 |
| 2022/0051425 | A1* | 2/2022 | Busam ...................... G06T 3/40 |

FOREIGN PATENT DOCUMENTS

| | | | |
|---|---|---|---|
| EP | 3219564 | A1 | 9/2017 |
| EP | 3673233 | A2 | 7/2020 |
| JP | 2019508677 | A | 3/2019 |
| WO | WO-2012014430 | A1 | 2/2012 |
| WO | WO-2020240284 | A2 | 12/2020 |
| WO | WO-2020240284 | A3 | 1/2021 |

OTHER PUBLICATIONS

Yang X, Gao Y, Luo H, Liao C, Cheng KT. Bayesian denet: Monocular depth prediction and frame-wise fusion with synchronized uncertainty. IEEE Transactions on Multimedia. Apr. 18, 2019;21(11):2701-13. (Year: 2019).*

Bhoi A. Monocular depth estimation: A survey. arXiv preprint arXiv:1901.09402. Jan. 27, 2019. (Year: 2019).*

Zhao, Chaoqiang, et al. "Monocular depth estimation based on deep learning: An overview." Science China Technological Sciences 63.9 (2020): 1612-1627. (Year: 2020).*

"International Application Serial No. PCT IB2020 000553, International Preliminary Report on Patentability dated Dec. 9, 2021", 9 pgs.

"International Application Serial No. PCT/IB2020/000553, International Search Report dated Nov. 27, 2020", 4 pgs.

"International Application Serial No. PCT/IB2020/000553, Written Opinion dated Nov. 27, 2020", 7 pgs.

"Japanese Application Serial No. 2021-567061, Notification of Reasons for Refusal dated Feb. 14, 2023", w/ English Translation, 6 pgs.

* cited by examiner

| Layer | Name | Type | Input/0 | Output/0 | Output Channels | Kernel Width | Kernel Step | Activation | Normalization | Input/1 | Scale |
|---|---|---|---|---|---|---|---|---|---|---|---|
| 1 | conv1 | Conv | images | conv1 | 8 | 3 | 1 | relu | batchNorm | | |
| 2 | conv2 | Conv | conv1 | conv2 | 8 | 3 | 2 | relu | batchNorm | | |
| 3 | conv3 | Conv | relu2 | conv3 | 16 | 3 | 2 | relu | batchNorm | | |
| 4 | conv4_red | Conv | conv3 | conv4_red | 8 | 1 | 1 | relu | batchNorm | | |
| 5 | conv4 | Conv | conv4_red | conv4 | 72 | 3 | 2 | relu | batchNorm | | |
| 6 | conv5_red | Conv | conv4 | conv5_red | 32 | 1 | 1 | relu | batchNorm | | |
| 7 | conv5 | Conv | conv5_red | conv5 | 192 | 3 | 2 | relu | batchNorm | | |
| 8 | conv6_concat | Concat | conv5 | conv6_concat | | | | | | epipole/motion | |
| 9 | conv6_red | Conv | conv6_concat | conv6_red | 64 | 1 | 1 | relu | batchNorm | | |
| 10 | conv6 | Conv | conv6_red | conv6 | 192 | 3 | 1 | relu | batchNorm | | |
| 11 | conv7_red | Conv | conv6 | conv7_red | 64 | 1 | 1 | relu | batchNorm | | |
| 12 | conv7 | Conv | conv7_red | conv7 | 192 | 3 | 1 | relu | batchNorm | | |
| 13 | conv8_red | Conv | conv7 | conv8_red | 64 | 1 | 1 | relu | batchNorm | | |
| 14 | conv8 | Conv | conv8_red | conv8 | 192 | 3 | 1 | relu | batchNorm | | |
| 15 | deconv7_red | Conv | conv8 | deconv7_red | 64 | 1 | 1 | relu | batchNorm | | |
| 16 | deconv7 | DeConv | deconv7_red | deconv7 | 192 | 5 | 1 | relu | batchNorm | | 2 |
| 17 | deconv4_red1 | Conv | deconv7 | deconv4_red1 | 16 | 1 | 1 | relu | batchNorm | | |
| 18 | deconv4_red2 | Conv | conv4 | deconv4_red2 | 16 | 1 | 1 | relu | batchNorm | | |
| 19 | deconv4_concat | Concat | deconv4_red1 | deconv4_concat | | | | | | deconv4_red2 | |
| 20 | deconv4 | DeConv | deconv4_concat | deconv4 | 72 | 5 | 1 | relu | batchNorm | | 2 |
| 21 | deconv3_concat | Concat | deconv4 | deconv3_concat | | | | | | conv3 | |
| 22 | deconv3 | DeConv | deconv3_concat | deconv3 | 16 | 5 | 1 | relu | batchNorm | | 2 |
| 23 | deconv2_concat | Concat | deconv3 | deconv2_concat | | | | | | conv2 | |
| 24 | deconv2 | DeConv | deconv2_concat | deconv2 | 16 | 5 | 1 | relu | batchNorm | | 2 |
| 25 | predict_concat | Concat | deconv2 | predict_concat | | | | | | conv1 | |
| 26 | predict | Conv | predict_concat | predict | 1 | 3 | 1 | | | | |

FIG. 6

| Layer | Name | Type | Input/0 | Output/0 | Output Channels | Kernel Width | Kernel Step | Activation | Normaliztion | Input/1 | Scale | Like Size | Input/2 |
|---|---|---|---|---|---|---|---|---|---|---|---|---|---|
| 1 | conv1 | Conv | images | conv1 | 8 | 7 | 2 | relu | batchNorm | | | | |
| 2 | conv1b | Conv | conv1 | conv1b | 8 | 7 | 1 | relu | batchNorm | | | | |
| 3 | conv2 | Conv | conv1b | conv2 | 16 | 5 | 2 | relu | batchNorm | | | | |
| 4 | conv2b | Conv | conv2 | conv2b | 16 | 5 | 1 | relu | batchNorm | | | | |
| 5 | conv3 | Conv | conv2b | conv3 | 32 | 3 | 2 | relu | batchNorm | | | | |
| 6 | conv3b | Conv | conv3 | conv3b | 32 | 3 | 1 | relu | batchNorm | | | | |
| 7 | conv4 red | Conv | conv3b | conv4 red | 16 | 1 | 1 | | | | | | |
| 8 | conv4 | Conv | conv4 red | conv4 | 64 | 3 | 2 | relu | batchNorm | | | | |
| 9 | conv4b concat | Concat | conv4 | conv4b concat | | | | | | epipole/motion | | | |
| 10 | conv4b | Conv | conv4b concat | conv4b | 64 | 3 | 1 | relu | batchNorm | | | | |
| 11 | conv5 red | Conv | conv4b | conv5 red | 32 | 1 | 1 | | | | | | |
| 12 | conv5 | Conv | conv5 red | conv5 | 128 | 3 | 2 | relu | batchNorm | | | | |
| 13 | conv5b | Conv | conv5 | conv5b | 128 | 3 | 1 | relu | batchNorm | | | | |
| 14 | conv6 red | Conv | conv5b | conv6 red | 32 | 1 | 1 | | | | | | |
| 15 | conv6 | Conv | conv6 red | conv6 | 128 | 3 | 2 | relu | batchNorm | | | | |
| 16 | conv6b | Conv | conv6 | conv6b | 128 | 3 | 1 | relu | batchNorm | | | | |
| 17 | conv7 red | Conv | conv6b | conv7 red | 32 | 1 | 1 | | | | | | |
| 18 | conv7 | Conv | conv7 red | conv7 | 128 | 3 | 2 | relu | batchNorm | | | | |
| 19 | conv7b | Conv | conv7 | conv7b | 128 | 3 | 1 | relu | batchNorm | | | | |
| 20 | deconv7 red | Conv | conv7b | deconv7 red | 32 | 1 | 1 | | | | | | |
| 21 | deconv7 | DeConv | deconv7 red | deconv7 | 128 | 5 | 1 | relu | batchNorm | | 2 | | |
| 22 | deconv7 resize | Resize | deconv7 | deconv7 resize | | | | | | | | conv6b | |
| 23 | icnv7 concat | Concat | deconv7 resize | icnv7 concat | | | | | | conv6b | | | |
| 24 | icnv7 red | Conv | icnv7 concat | icnv7 red | 32 | 3 | 1 | | | | | | |
| 25 | icnv7 | Conv | icnv7 red | icnv7 | 128 | 3 | 1 | relu | batchNorm | | | | |
| 26 | deconv6 red | Conv | icnv7 | deconv6 red | 32 | 1 | 1 | | | | | | |
| 27 | deconv6 | DeConv | deconv6 red | deconv6 | 128 | 5 | 1 | relu | batchNorm | | 2 | | |
| 28 | deconv6 resize | Resize | deconv6 | deconv6 resize | | | | | | | | conv5b | |

FIG. 7

| Layer | Name | Type | Input/0 | Output/0 | Output Channels | Kernel Width | Kernel Step | Activation | Normaliztion | Input/1 | Scale | Like Size | Input/2 |
|---|---|---|---|---|---|---|---|---|---|---|---|---|---|
| 29 | icnv6 concat | Concat | deconv6 resize | icnv6 concat |  |  |  |  |  | conv5b |  |  |  |
| 30 | icnv6 red | Conv | icnv6 concat | icnv6 red | 32 | 3 | 1 | relu | batchNorm |  |  |  |  |
| 31 | icnv6 | Conv | icnv6 red | icnv6 | 128 | 3 | 1 |  |  |  |  |  |  |
| 32 | deconv5 red | Conv | icnv6 | deconv5 red | 16 | 1 | 1 | relu | batchNorm |  |  |  |  |
| 33 | deconv5 | DeConv | deconv5 red | deconv5 | 64 | 5 | 1 |  |  |  | 2 |  |  |
| 34 | deconv5 resize | Resize | deconv5 | deconv5 resize |  |  |  |  |  |  |  | conv4b |  |
| 35 | icnv5 concat | Concat | deconv5 resize | icnv5 concat |  |  |  |  |  | conv4b |  |  |  |
| 36 | icnv5 red | Conv | icnv5 concat | icnv5 red | 16 | 3 | 1 | relu | batchNorm |  |  |  |  |
| 37 | icnv5 | Conv | icnv5 red | icnv5 | 64 | 3 | 1 | relu | batchNorm |  |  |  |  |
| 38 | deconv4 | DeConv | icnv5 | deconv4 | 32 | 5 | 1 |  |  |  | 2 |  |  |
| 39 | icnv4 concat | Concat | deconv4 | icnv4 concat |  |  |  |  |  | conv3b |  |  |  |
| 40 | icnv4 | Conv | icnv4 concat | icnv4 | 32 | 3 | 1 | relu | batchNorm |  |  |  |  |
| 41 | predict 3 | Conv | icnv4 | predict 3 | 1 | 3 | 1 |  |  |  |  |  |  |
| 42 | predict 3 resize | Resize | predict 3 | predict 3 resize |  |  |  |  |  |  |  |  | predict 3 resize |
| 43 | deconv3 | DeConv | icnv4 | deconv3 | 16 | 5 | 1 | relu | batchNorm |  | 2 |  |  |
| 44 | icnv3 concat | Concat | deconv3 | icnv3 concat |  |  |  |  |  | conv2b |  |  |  |
| 45 | icnv3 | Conv | icnv3 concat | icnv3 | 16 | 3 | 1 | relu | batchNorm |  |  |  |  |
| 46 | predict 2 | Conv | icnv3 | predict 2 | 1 | 3 | 1 |  |  |  |  |  |  |
| 47 | predict 2 resize | Resize | predict 2 | predict 2 resize |  |  |  |  |  |  |  |  | predict 2 resize |
| 48 | deconv2 | DeConv | icnv3 | deconv2 | 8 | 5 | 1 | relu | batchNorm |  | 2 |  |  |
| 49 | icnv2 concat | Concat | deconv2 | icnv2 concat |  |  |  |  |  | conv1b |  |  |  |
| 50 | icnv2 | Conv | icnv2 concat | icnv2 | 8 | 3 | 1 | relu | batchNorm |  |  |  |  |
| 51 | predict 1 | Conv | icnv2 | predict 1 | 1 | 3 | 1 |  |  |  |  |  |  |
| 52 | predict 1 resize | Resize | predict 1 | predict 1 resize |  |  |  |  |  |  |  | images |  |
| 53 | deconv1 | DeConv | icnv2 | deconv1 | 8 | 5 | 1 | relu | batchNorm |  | 2 |  |  |
| 54 | icnv1 concat | Concat | deconv1 | icnv1 concat |  |  |  |  |  | predict 1 resize |  |  |  |
| 55 | icnv1 | Conv | icnv1 concat | icnv1 | 8 | 3 | 1 | relu | batchNorm |  |  |  |  |
| 56 | predict | Conv | icnv1 | predict | 1 | 3 | 1 |  | batchNorm |  |  |  |  |

FIG. 8

VEHICLE ENVIRONMENT MODELING WITH CAMERAS

RELATED MATTERS

This patent application is a U.S. National Stage Application under 35 U.S.C. 371 from International Application No. PCT/IB2020/000553, filed May 29, 2020, and published as WO 2020/240284 on Dec. 3, 2020, which claims the benefit of priority, under 35 U.S.C. § 119, to: U.S. Provisional Application Ser. No. 62/854,818, titled "VEHICLE ENVIRONMENT MODELING WITH CAMERAS" and filed on May 30, 2019, the entirety of which are hereby incorporated by reference herein.

TECHNICAL FIELD

Embodiments described herein generally relate to computer vision techniques and more specifically to vehicle environment modeling with a camera.

BACKGROUND

Autonomous or semi-autonomous automotive technologies, often referred to as "self-driving" or "assisted-driving" operation in automobiles, are undergoing rapid development and deployment in commercial- and consumer-grade vehicles. These systems use an array of sensors to continuously observe the vehicle's motion and surroundings. A variety of sensor technologies may be used to observe the vehicle's surroundings, such as the road surface and boundaries, other vehicles, pedestrians, objects and hazards, signage and road markings, and other relevant items.

Image-capture sensors that are implemented with one or more cameras are particularly useful for object detection and recognition, and reading signs and road markings. Camera-based systems have been applied for measuring three-dimensional structures, such as the vertical contour of the road, lane markers, and curbs, and in detecting objects or hazards. Practical sensor systems are expected to operate reliably in varying weather and road conditions. These expectations tend to introduce myriad challenges in processing the inputs. Input noise from shadows or lights at night may interfere with road surface detection. Wet roads, or other reflective surfaces, often introduce apparent motion that is contrary to road surface models. Further, the need for fast (e.g. real-time) detection of hazards while modeling road surfaces to enable autonomous or assisted driving imposes a burden on hardware given these road surface detection difficulties.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 is a table detailing an example architecture of a DNN, according to an embodiment;

FIGS. 7-8 are tables detailing a more complex example architecture of a DNN, according an embodiment;

DETAILED DESCRIPTION

Figure 1:
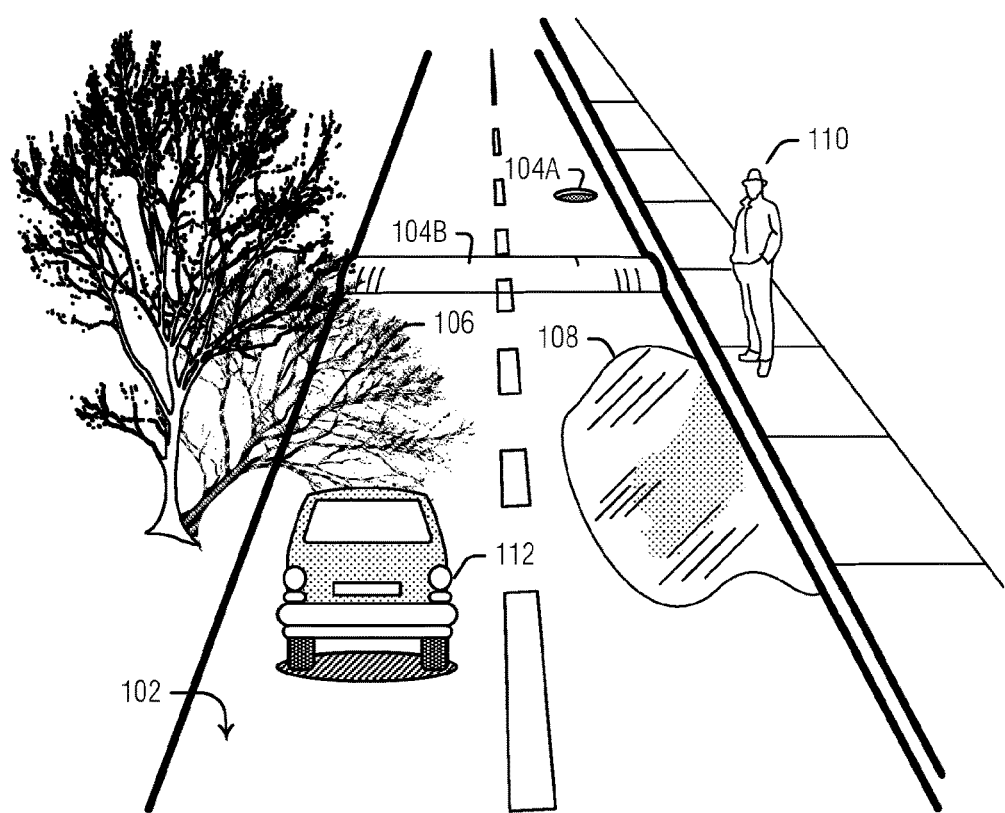
FIG. 1 is a block diagram of an example of a vehicle environment.

A variety of vehicle environment modeling techniques may be used with a variety of sensor configurations. When using a camera (e.g., visual light spectrum, infrared (IR), etc.), the sensors produce an image composed of pixels. Various aspects of the pixels may be used in modeling, such as color or luminance. Generally, to model a dynamic environment, a sequence of images is used. This type of modeling tracks the movement of pixels between sequential images to infer aspects of the environment, such as how the vehicle is moving, how other vehicles are moving, how objects (e.g., people, animals, balls, etc.) are moving, obstacles in the road, etc.

An iterative process of transforming images to a normalized state (e.g., to correct for camera lens distortion), aligning pixels between images in sequence (e.g., warping an earlier image to largely match a later image via a homography), and measuring remaining pixel motion (e.g., residual motion) may be used to model the environment.

There are some difficulties, however, with using direct pixel matching. For example, many things that may project onto a road surface do not represent a road surface, such as shadows or reflective patches (e.g., puddles). Although filtering techniques may be used to reduce this noise, a better solution involves an artificial intelligence (e.g., machine learning system, artificial neural network (ANN), deep ANN (DNN), convolutional ANN (CNN), etc.) trained to compute gamma directly from a sequence of images. This entails a robust solution to common noise problems in road surface imaging. Further, such systems may also accept the sensor motion or the epipole information to further enhance its gamma results. From gamma, a height of a pixel above the road plane and a distance to that pixel may be determined.

Road surface modeling may be useful to, for example, avoid potholes or adjust suspension for speed bumps. Determining gamma directly from sensor data (e.g., by an ANN) may be superior to other techniques like using two-dimensional (2D) optical flow to ascertain residual flow or using an ANN to determine height above plane and distance to the sensor, because it enforces the epipolar constraints. Further, one gamma may be used to align (e.g., warp) all the images of that point.

Although the ANN may be trained to directly determine the depth or the height of the point, gamma provides a few benefits. For example, gamma computation is more stable than depth because significant changes in height from the plane may result in small relative changes in depth from the camera. Also, given H and the reference plane, it is possible to compute depth Z and then the residual flow, but this adds complexity because the ANN processes more data for the same result. This is also a reason to pre-warp images with a plane model and provide ego-motion (EM) (e.g., motion of the sensor or vehicle such as the epipole $\vec{e}$ and $$\frac{T_Z}{d_\pi^r})$$

as input.

In an example, the network may be trained, using similar techniques, to compute Z or H instead of gamma. In this example, homography plane input parameters may be provided to the ANN. For example, the plane may be defined as a horizon line (e.g., the vanishing line of the plane) and a distance to the plane. The line may be provided as a pair of distance images, and the distance to the plane provided as a constant image. This is similar to the way epipole and $T_z$ are provided as input above. In an example, the input images are aligned to account only for rotation (e.g., using a homography using a plane at infinity) and compute Z.

In an example, instead of computing gamma for the whole image and then using only the gamma along a particular path (e.g., for suspension control), the ANN may be trained to produce gamma only along a specified path. This may be more computationally efficient, for example if the output is only used for something applicable to vehicle tires, such as suspension control because the deconvolutional operations may be computationally expensive. Path discrimination (e.g., producing gamma only for the path) may be implemented in a number of ways. For example, the path may be given as input at the inference stage of the ANN, the ANN being trained to only output values along the path. In an example, the full ANN may be trained to produce gamma as described above. During inference, when the path is given, a determination is made as to which (de)convolutions are required in the expansion stage for the path and applying only those. For example, to determine gamma values for a complete row of output, convolutions along a whole row are needed. However, for only a segment of the output row, the deconvolutions need only be performed in a certain range corresponding to the segment.

Additionally, a similar structured ANN, trained differently, may also classify objects as moving or not moving. The moving/not-moving classification may be used, for example, to improve a host vehicle's ability to better choose accident avoidance actions. Again, the input images are used directly to identify residual motion in features and determine the result.

In various embodiments described herein, a neural network may be used to detect objects in a road scene or to produce a model of an environment. One embodiment includes training a neural network to produce a multidimensional representation of a road surface (e.g., a gamma image) from a series of images. The images may be produced by one or more cameras in a vehicle. Other embodiments may train the neural network from images obtained by more than one vehicle. An aspect of the training technique is the ability to calculate a ground truth to compare to the neural network's output to ascertain how to adjust the neural network such that a next output is more accurate than the last.

A wide variety of training data benefits the neural network development. It may be most efficient to acquire the training data from autonomous or semi-autonomous vehicles on the road. However, as the training data comes from working vehicles in uncertain environments, ascertaining the ground truth of the environment for any given training image may be challenging.

In an example instance of training, multiple images from the same camera that were captured at different times are used to train the neural network. Later, the motion of the camera, as the vehicle moves, provides differing perspectives (e.g., information) that the trained neural network uses to produce the three-dimensional (3D) model of the environment.

An issue that may arise involves objects moving within the scene, such as other vehicles. Stationary objects tend to transform in a predictable way as the camera perspective moves within the scene. For example, with a vertical object, such as light pole, the bottom of the pole moves with a road surface, while the top of the pole may appear to move faster than the road surface as the camera approaches. In contrast, moving objects generally do not change between images in the same manner as fixed objects. For example, a vehicle traveling at the same speed and direction as the vehicle hosting the camera may appear to be the same size in each successive image.

The differing response between moving and fixed objects may lead to artifacts in the neural network training that may impact the accuracy of the environmental model. A technique to combat this, involves identifying moving objects and then ignoring (e.g., masking) them in the training images to reduce their impact on the training. This is akin to punishing or rewarding the network based solely on its output for fixed (e.g., static, non-moving) areas of the environment represented in the images. However, this masking may lead to a few issues. For example, the result generally does not have useful 3D information on the moving objects. Also, different artifacts may emerge in the output, such as predicting holes (e.g., depressions) in the vicinity of moving objects where no holes exist. Further, because the moving objects at issue are often vehicles in front of the camera, the network may be inadvertently trained to erase (e.g., ignore) objects directly in front of the camera whether or not the objects are moving or fixed.

To address this, multiple cameras on a vehicle that have overlapping fields of view (FOB) may be used to train the neural network. In an example, the multiple image frames used to train the network may be taken from multiple cameras at one point in time rather than from one camera at multiple points in time. Because the different perspectives are captured at the same time, there is no longer distinction between moving and fixed objects. Rather, the varying perspectives may be used to model the 3D characteristics of all objects in the scene to provide the ground-truth used to train the neural network. Additional details are provided below.

FIG. 1 is a block diagram of an example of a vehicle environment. As depicted, field of view 100 includes road surface 102, which may have one or more surface features 104, such as depressions 104A (e.g., potholes, grates, depressions, etc.) or protrusions 104B (e.g., speed bumps, curbs, debris, etc.). Field of view 100 may also include a shadow 106, a reflective surface 108 (e.g., a puddle, ice, etc.), a pedestrian 110, or another vehicle 112. Modeling the surface features 104 may enable the vehicle to avoid them, alert a driver, or adjust itself to better handle them (e.g., adjust vehicle suspension to traverse the pothole 104A). Understanding and modeling the moving, or potentially moving, pedestrian 110 or vehicle 112 may similarly enable vehicle control changes or driver alerts to avoid hitting them, or even avoid or lessen undesirable interactions with them— e.g., splashing the pedestrian 110 by driving through the puddle 108—such as by slowing down, or adjusting the driving path, stopping, etc.).

These elements of road modeling may each present a challenge that is addressed by the devices and techniques described herein. For example, the shadow 106 is noise for road surface point tracking. Reflections from the puddle 108 not only obscure the underlying road surface to impair point tracking, but actually exhibits pixel motion between images that is often contrary to pixel motion elsewhere. For example, the image motion of a building (50 m away) reflected in a puddle (on the road 10 m away) will be the apparent motion of an object at the distance to the building. This might erroneously be interpreted as a hole in the road in this case about 6 m deep.

Figure 2:
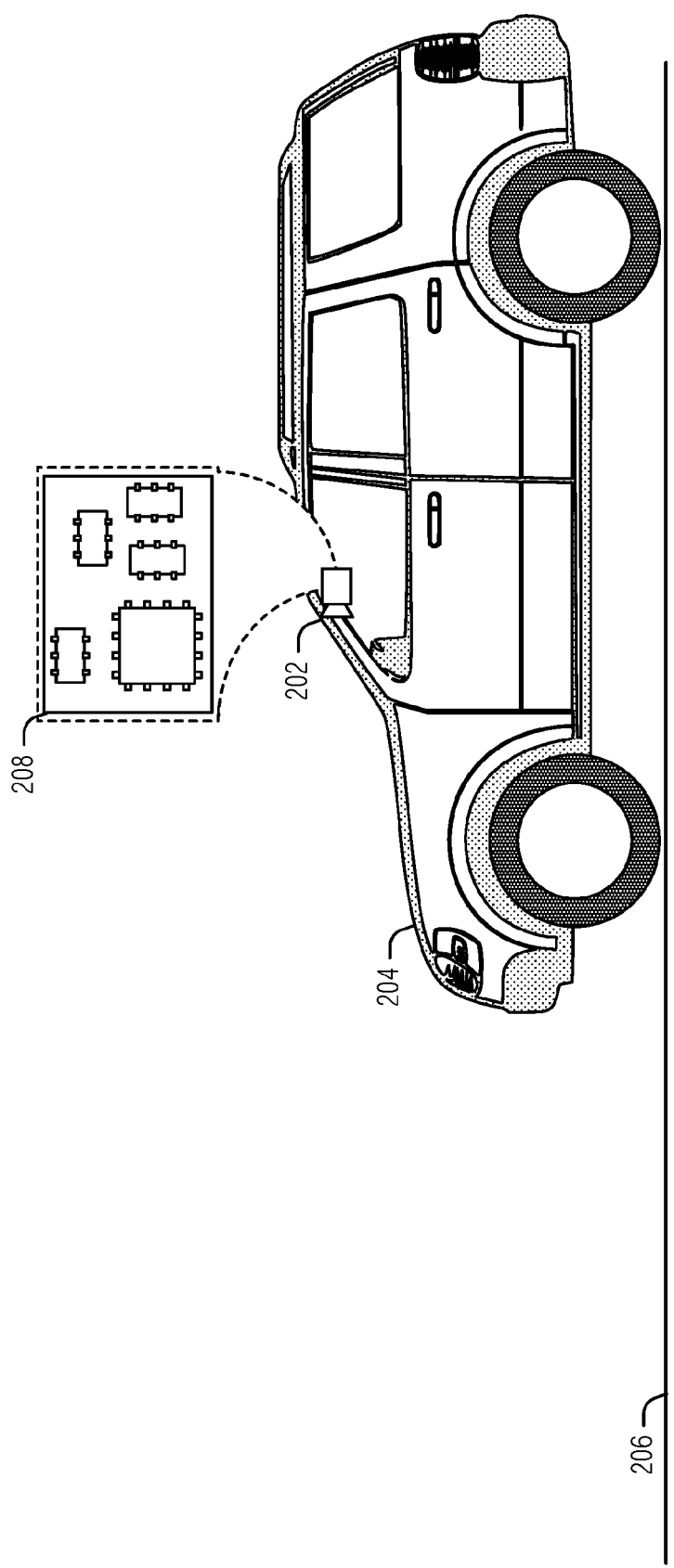
FIG. 2 is a block diagram of an example of a system for vehicle environment modeling with an image sensor, according to an embodiment.

FIG. 2 is a block diagram of an example of a system 208 for vehicle environment modeling with an image sensor 202, according to an embodiment. The system 208 is affixed to the vehicle 204. In an example, the system 208 is integrated with the image sensor 202, or other sensor. In an example, the system 208 is separate from the image sensor 202, or other sensor (e.g., part of an infotainment system of the vehicle 204). Here, the image sensor 202 is shown by way of example as a forward-looking camera mounted on the windshield (on the interior of the vehicle side). However, the techniques described herein apply equally to rear or side facing cameras mounted inside or outside of the vehicle. One such example is a camera mounted externally on the corner of the roof with a field of view that is forward and a bit to the side. Multiple image sensors 202 may be used to capture images or video footage around the vehicle 204. The image sensors 202 may be mounted or affixed to various portions of the vehicle 204, such as a front right location, a front left location, a middle windshield location, a roof location, a rear window location, or the like. Fields of view of some of the images sensors 202 may overlap.

The system 208 includes processing circuitry to perform vehicle environment modeling via images obtained from the image sensor 202. The vehicle environment modeling may include modeling the road surface 206, obstacles, obstructions, and moving bodies (e.g., other vehicles, pedestrians, animals, etc.). These models may be used by the system 208 directly, or via another management system, to adjust operating parameters of the vehicle 204. To perform the modeling, the system 208 is arranged to obtain a time-ordered sequence of images representative of the road surface 206. One of the sequence of images is a current image (e.g., the last image taken by the camera 202).

The system 208 is arranged to provide a data set to an artificial neural network (ANN) to produce a gamma image. Here, pixels of the gamma image are gamma values for points. As noted elsewhere, the gamma value is a ratio of a height of a point above a plane by a distance from a sensor capturing the current image. Also, here, the plane represents the road surface 206. Alternatively, a system may output other descriptions of structure such as distance (Z), inverse distance (1/Z), or height above the road H. The advantage of using gamma is that it is normalized for factors such as camera focal length and is more directly related to the image motion signal. Thus, a DNN trained on data from one camera can be used to analyze images from a different camera configuration.

Although "gamma image" is used herein, other data formats may be used to represent gamma in a scene. Thus, the gamma may not be in a raster format, but may be in any form (e.g., a gamma map of values to points) that enables the gamma value to be correlated to a surface via the sensor data. Collectively, these various data structures may be referred to as a gamma model.

In an example, the data set includes a portion of the sequence of images. Here, the portion of the sequence of images includes the current image. The data set also includes motion of the image sensor 202 (e.g., indicating sensor movement information) and an epipole (e.g., epipole information). In an example, the portion of the sequence of images includes images immediately preceding the current image. In an example, the portion of the sequence of images is three images in total. In an example, the sequence may include any n number of images, where n is an integer greater than one (i.e., $\{n \in \mathbb{I} | n > 1\}$). In an example, images in a sequence may be consecutively captured images. In an example, some frames from an original sequence of frames may be omitted in the process of generating the sequence of images that is used in the data set.

In an example, the epipole is provided as a gradient image with the same dimensionality (albeit at a possibly greater or lesser resolution) as the current image. Here, values of pixels in the gradient image represent a distance from the epipole of pixels in the current image. In an example, the gradient image represents only horizontal (e.g., x-axis) distances from the epipole and a second gradient image is provided to the ANN to represent vertical (e.g., y-axis) distances from the epipole.

In an example, the motion of the image sensor 202 is provided as a constant value image with a same dimensionality (albeit at a possibly greater or lesser resolution) as the current image. In an example, the constant value is a ratio of forward motion of the image sensor 202 (e.g., z-axis) by a height of the sensor 202 from the plane 206.

In an example, the ANN is a convolutional neural network (CNN). In an example, the motion of the image sensor 202 and the epipole are provided to the CNN at a bottleneck layer (e.g., see the discussion below with respect to FIG. 5)

In an example, the ANN is trained with an unsupervised training technique in which error is determined by measure a difference between predicted gamma for a location and image sensor 202 movement at the location (i.e., actual motion). Thus, gamma is predicted and the ego-motion of the image sensor 202 or vehicle 204 is used to determine whether the gamma inference was correct (or how wrong the inference was). In this example, if the ANN predicts a dip in the road surface 206, and no such dip is later detected by the vehicle, then the training corrects the inference that predicted the dip. In an example, the sensor movement may include one of more of pitch, yaw, roll, or translation perpendicular to the plane.

The system 208 is arranged to model the road surface 206 using the gamma image. In an example, modeling the road surface includes computing a vertical deviation from the plane of a road surface feature. In an example, modeling the road surface includes computing residual motion of features in the sequence of images. Here, the residual motion of a feature is a product of the gamma value, the motion of the image sensor 202, and the epipole.

In an example, modeling the road surface includes warping a previous image to the current image using the gamma value. The gamma-based warping is particularly accurate because the gamma enables a feature to be matched between images based on its distance from the sensor 202 and its height above the road surface 206 rather than trying to match sometimes ephemeral or complex color variations of pixels of those features in the images.

Figure 3:
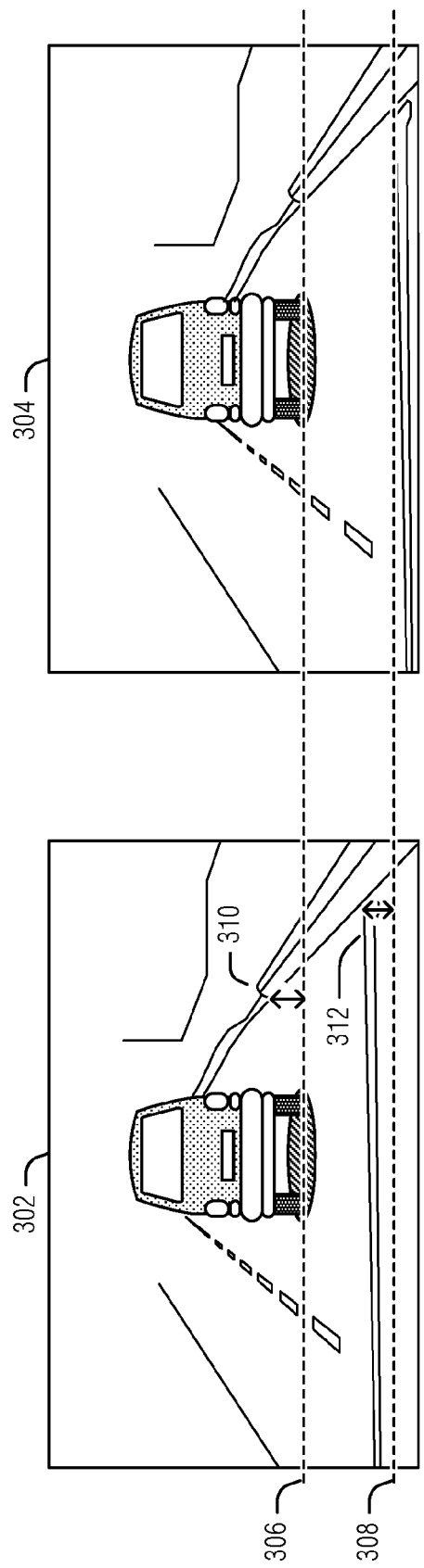
FIG. 3 illustrates a current image and a previous image, according to an embodiment.

FIG. 3 illustrates a current image 304 and a previous image 302, according to an embodiment. The two lines 306 and 308 are placed at the bottom of the tires and at the top of the speed bump, respectively, in the current image 304. Note how the line 306 aligns with the tires in the previous image 302. The double-ended arrow from the line indicates the line's movement with respect to the stationary end of a curb 310. Similarly, the line 308 shows that the top of the speedbump 312 has moved between the previous image 302 and the current image 304. When image 302 is warped to image 304, the stationary features of the images will match but the bottom of the vehicle will move.

Figure 4:
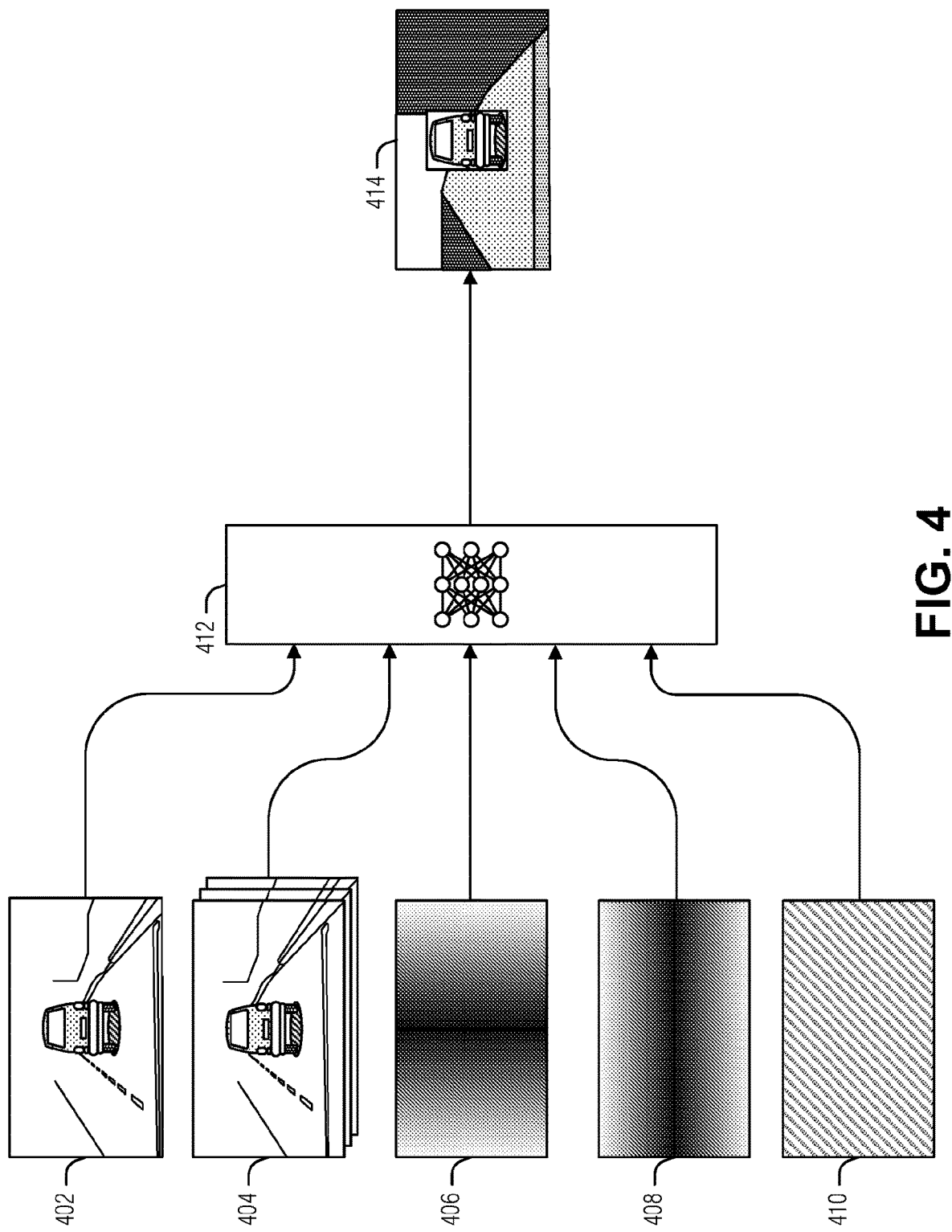
FIG. 4 illustrates an example of a neural network to produce a gamma model of a road surface, according to an embodiment.

FIG. 4 illustrates an example of a neural network 412 to produce a gamma model 414 of a road surface, according to an embodiment. FIGS. 5-10 illustrate some additional details and examples of neural networks like neural network 412. However, as an overview, the residual motion for each pixel is composed of three parts: gamma, sensor motion (e.g., vehicle motion), and epipole information, as follows:

$$\vec{\mu} = \frac{H}{Z}\frac{T_Z}{d'_\pi}(\vec{e} - \vec{p}_w)$$

Epipole information depends on the image coordinate after the homography $\vec{p}_w$ and the epipole $\vec{e}$. This may be calculated for each pixel given the ego-motion (EM) of the sensor. Sensor movement information depends on the forward motion $T_z$ and the sensor height from the plane $d'_\pi$. This is fixed for the whole image.

Gamma describes the structure of a scene at each pixel via the height H of a point above the plane and a distance Z to the point from the sensor. Thus, given the sensor movement information and the epipole information, the neural network 412 determines the gamma model 414, and the residual motion for each point may be calculated to enable one image to be warped to another.

Given an accurate gamma model 414, image warping is very accurate, often behaving as if the images were of a static scene, because of the distance and height of each pixel. Classic techniques first computed the residual flow and then the gamma was computed by removing the epipole information and the sensor movement information. From gamma the height and the distance of a point were computed along one or more tracks (e.g., tire paths). As noted above, however, the varying degree of noise in road surface images caused direct residual motion detection to sometimes be problematic.

Training the neural network 412 to calculate gamma directly from the images provides a robust counter to the noise found in the images. Thus, given a current image 402, one or more previous images 404 warped using a homography and the ego-motion 410 and epipole (e.g., plane) parameters (images 406 and 408) as input, the neural network produces an image of gamma values 414 as output. As illustrated, the lighter the shading in the gamma model 414, the lower the gamma value.

In other systems, the vehicle is omitted from the loss calculation when training the neural network 412. This is done to prevent the motion of the vehicle from effecting nearby gamma values during training, however, the vehicle will generally not be masked during inference. In an example, the vehicle, or other moving objects, are not masked from the neural network 412 loss function during training.

In the current implementation, the vehicle does not need to be masked during training. Instead, the current image 402 includes multiple images from multiple image sensors that were taken at the same time. For instance, images from a main camera, a left corner camera, and a right corner camera, may be used as the current image set. Using multiple images that were captured at the same time allows for the neural network 412 to train with three-dimensional (3D) information that may be obtained from image analysis between the left and right corner cameras, for example. More description of how the neural network 412 is trained using 3D information from the current frame is provided below.

As illustrated, the epipole information and the sensor movement information are provided as images (e.g., a raster of values). The sensor movement information image 410 is a constant valued image (e.g., every pixel has the same value). The epipole information represented by two images respectively having pixels values of a distance to the epipole in horizontal (e.g., x) 406 and vertical (e.g., y) 408 directions. Providing the epipole information as gradient images, rather than two values, is helpful when using a convolutional neural network (CNN). In a CNN, the same filter bank is run over the whole image 402, and each image region must be told where it is in relation to the epipole. By using the gradient images 406 and 406, the filter has the epipole information for each convolution.

Figure 5:
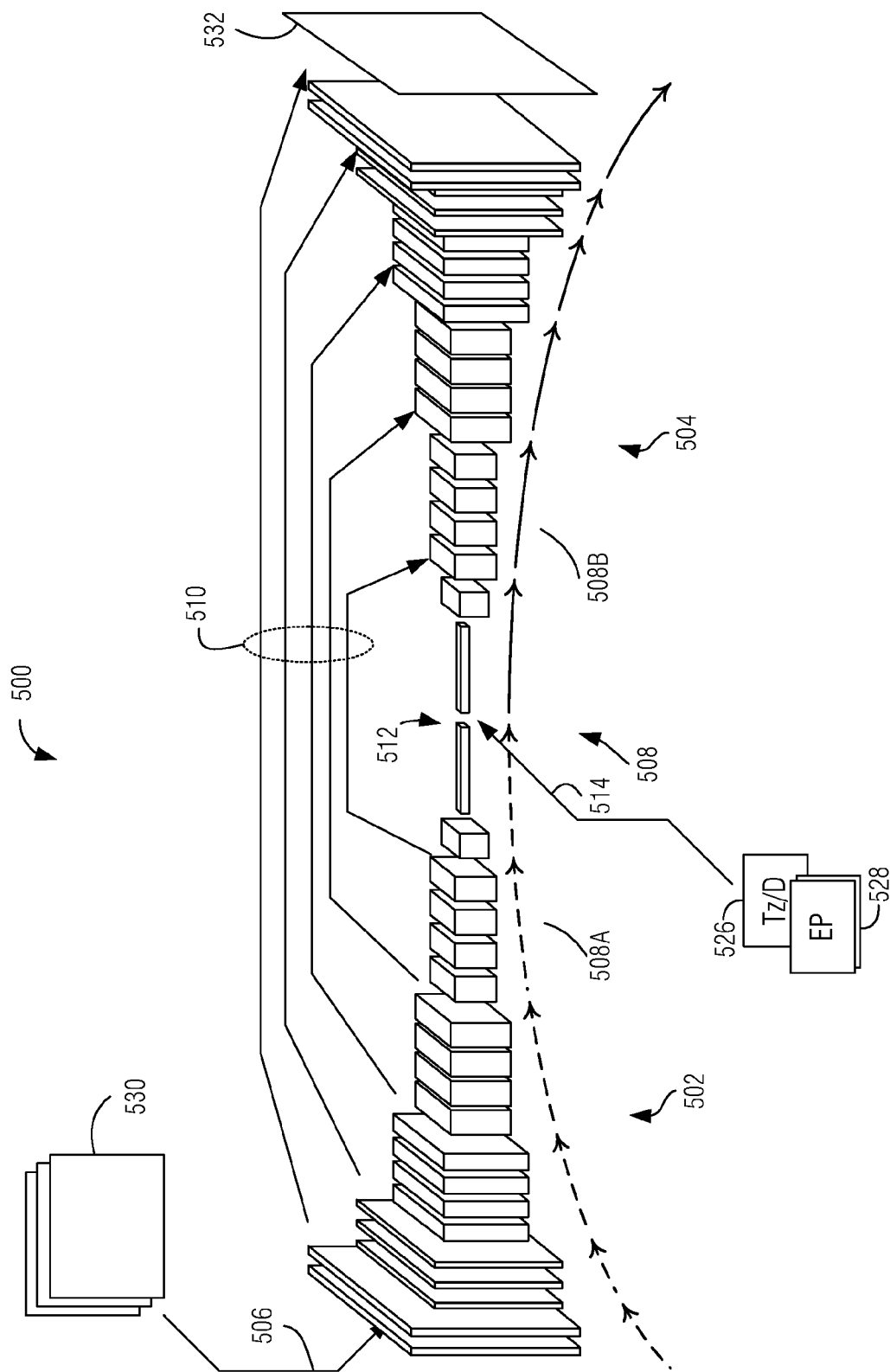
FIG. 5 illustrates an example deep neural network (DNN) of a machine-learning (ML)-based vertical contour engine, according to an embodiment.

FIG. 5 is a diagram illustrating an example DNN 500 of ML-based contour engine. In an example. As depicted, DNN 500 includes convolutional network portion 502 having various operational layers, which may include convolution, activation, normalization, and pooling layers. Other operational layers may be additionally included, such as inner product layers. In an example, the DNN 500 additionally includes deconvolution portion 504, including deconvolution (e.g., transposed convolutional), activation, normalization, and un-pooling layers.

In an example, the set of preprocessed images 530 are provided as input 506 to convolutional network portion 502. Each layer produces a feature map, which is in turn passed to the subsequent layer for further processing along forward propagation path 508. As depicted, the operations of convolutional network portion 502 operate to progressively reduce resolution of the feature maps, while increasing the number of channels (dimensionality) of the feature maps along convolutional forward propagation path 508A. The operations of deconvolutional network portion 504 operate to progressively increase resolution of the feature maps, while decreasing their dimensionality along deconvolutional forward propagation path 508B.

In an example, in addition to forward propagation path 508, one or more bypass paths 510 may be provided to facilitate the passing of feature maps from a prior layer to a latter layer while skipping over one or more intermediary layers situated between those prior and latter layers. As an example, bypass paths 510 may pass feature maps between a layer of convolutional network portion 502, and a similarly dimensioned layer of deconvolutional network portion 504.

A "bottleneck" network portion 512 is situated between convolutional network portion 502 and deconvolutional network portion 504. In an example, bottleneck network portion 512 has one or more layers with relatively lower resolution and higher dimensionality compared to other layers. In an example, bottleneck portion 512 includes inputs 514 that are configured to accept image-formatted motion indicia 526 and image-formatted epipole location data 528.

In an example, the DNN 500 is trained to produce road structure 532 as a pixel-wise mapping of gamma values corresponding to the current (most recent) image of preprocessed images 530. Road structure 532 as the output of DNN 500 may be at the same, or a different, resolution as preprocessed images 530. For instance, the resolution of road structure 532 may be scaled by a factor or 0.25, 0.5, 1, 1.5, 2, or other scaling factor, which may be an integer or non-integer value.

In another an example, road structure 532 may correspond to a portion of the current image of preprocessed images 530. For instance, road structure 532 may correspond to a cropped image of field of view 100 (FIG. 1) that omits some portions thereof that do not represent the road surface.

Notably, gamma values in the pixels of road structure 532 are dimensionless values. In an example, DNN 500 produces as its output a mapping of other dimensionless values such as $$\frac{Z}{\delta Z}$$

for points above the horizon. When the value of gamma is known, distance Z and height of the road surface H may be recovered using the relationship $$Z = \frac{camH}{\gamma - N'\left(\frac{x}{f}, \frac{y}{f}, 1\right)},$$

where N' is N transposed, (x,y) are the image coordinates, and f is focal length.

Figure 9:
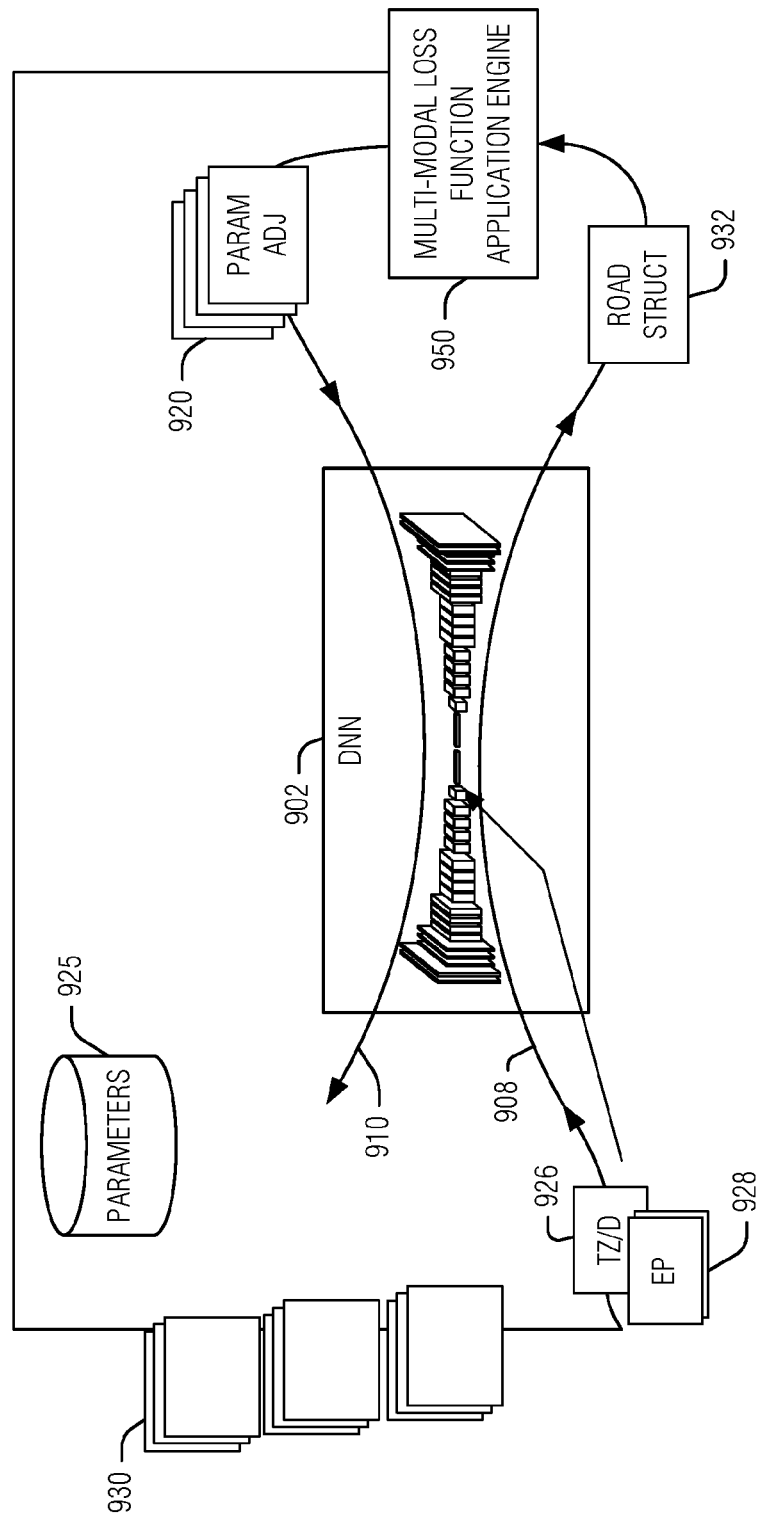
FIG. 9 illustrates an example of a DNN training system, according to an embodiment.

DNN training engine 550 is configured to train DNN 500 to produce an accurate determination of road structure 532 based on a set of training data. FIG. 9 is a diagram illustrating DNN training system 550 in greater detail. As depicted, DNN training system 550 includes DNN 902 having the same or similar architecture as DNN 500, and multi-modal loss function application engine 950.

FIG. 6 is a table detailing an example architecture of a DNN, according to an embodiment. As shown, each layer is described in terms of its operation type, connections (indicated as Input0, Input1, and Output0), number of output channels, and convolution/deconvolution architecture (including kernel width and step), as well as activation function and normalization type. Notably, layers having a second input indicated in the Input/1 column, and the identified second input source, have bypass connections.

The input to layer 1 the DNN of FIG. 6 includes a set of preprocessed images, indicated as "images" in the Input/0 column. Image-formatted epipole indicia, and image-formatted motion indicia are input to layer 8, as indicated by "epipole/motion" in the Input/1 column.

FIGS. 7-8 are tables detailing a more complex example architecture of a DNN, according to an embodiment. Images are input to the DNN at layer 1 as indicated by "images" in the Input/1 column. Image-formatted epipole indicia, and image-formatted motion indicia are input to layer 9, as indicated by "epipole/motion" in the Input/1 column. Some layers (layers 44 and 49) have a third input for bypass connections, represented with the Input/2 column. In addition, certain layers of the example DNN of FIGS. 7-8 perform resizing operations, such as layers 22, 28, 34, 42, 47, and 52. Notably, layer 52 resizes the feature maps to the same size as the preprocessed images 330.

FIG. 9 illustrates an example of a DNN training system, according to an embodiment. Here, a multi-modal loss function application engine 950 is configured to supply training data 930 as input to DNN 902. Training data 930 may include various sequences of image frames captured by one or more vehicle-mounted cameras. The image frames may include video footage captured on various roads, in various geographic locales, under various lighting and weather conditions, for example. Images may include images captured from several image capture devices on the same vehicle at the same time.

Training data 930 may be accompanied by image-formatted motion indicia 926 and image-formatted epipole indicia 928 corresponding to respective portions of training data 930. Image-formatted motion indicia 926 and image-formatted epipole indicia 928 may be fed to an input layer that differs from the input layer for the image frames of training data 930 to match the structural and operational arrangement of the DNN 902. The inputs are advanced through DNN 902 along forward propagation path 908 to produce road structure 932 as the output of the DNN 902.

The DNN 902 may be initially configured with randomized values of computational parameters (e.g., weights, biases, etc.). The training process works to adjust the values of the computational parameters to optimize the output of the DNN 902, the road structure 932. The multi-modal loss function application engine 950 is configured to perform the parameter optimization. In an example, multiple different loss functions are used to determine accuracy of the output of the DNN 902. Multi-modal loss function application engine 950 produces computational parameter adjustments 920 for the various layers of DNN 902, which are instituted using back propagation along backwards propagation path 910.

In an example, computational parameter adjustments 920 for the various layers of the DNN 902 are collected and stored in computational-parameter data structure 925, which defines the training result of the DNN 902. In an example, the computational-parameter data structure 925 is passed (e.g., as part of the output of DNN training system) to a vertical contour detection engine, where it is stored as a computational parameter to configure a ML-based contour engine.

Figure 22:
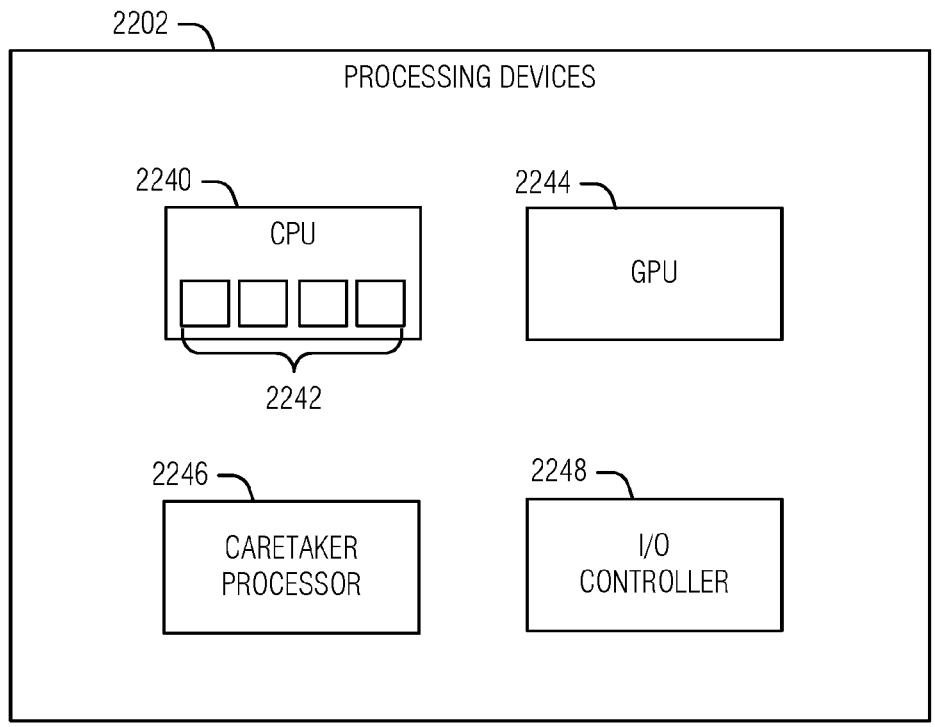
FIG. 22 is a block diagram illustrating processing devices that may be used according to an embodiment.

In an example, where multiple cameras and overlapping fields of view are used, the related images from multiple views may be used to achieve geometric loss function training. For example, the left and center images (at time t3) may be processed with a requirement that the gamma-warped images from time t3 are similar photometrically to center image at time t3. A future two pairs of images may be used to set the condition that the gamma inferred from those images is similar, after correcting for camera motion, to the gamma derived using images from times t1 and t2. In an example, a center main camera may be used together with one or more cameras mounted on the left or right corners of the vehicle roof which look forward and to the side. These side cameras may have a field-of-view wider than 90 degrees. The right camera field-of-view may significantly overlap the right field-of-view of the main camera and may have a field-of-view that extends backwards. The left camera may have a field-of-view that significantly overlaps the left field-of-view of the main camera and may have a field-of-view that extends backwards. This arrangement of cameras is shown in FIG. 22, where camera 2212B is the main camera, and cameras 2212A and 2212C are respectively the left and right-side cameras. In an example, images from the corner cameras may be used in the training stage to compute the loss function without being used in the inference stage.

In an example, inference engine training runs both on the current triplet and the future triplet to produce output_curr and output_future, respectively. The geometric loss may be combined with other losses from the output_curr, and propagated back to adjust the weights of the network and also the losses from output_future without the geometric loss are propagated to adjust the weights. In an example, the geometric losses of output_future may be ignored, with only the output_curr used for training.

Figure 10:
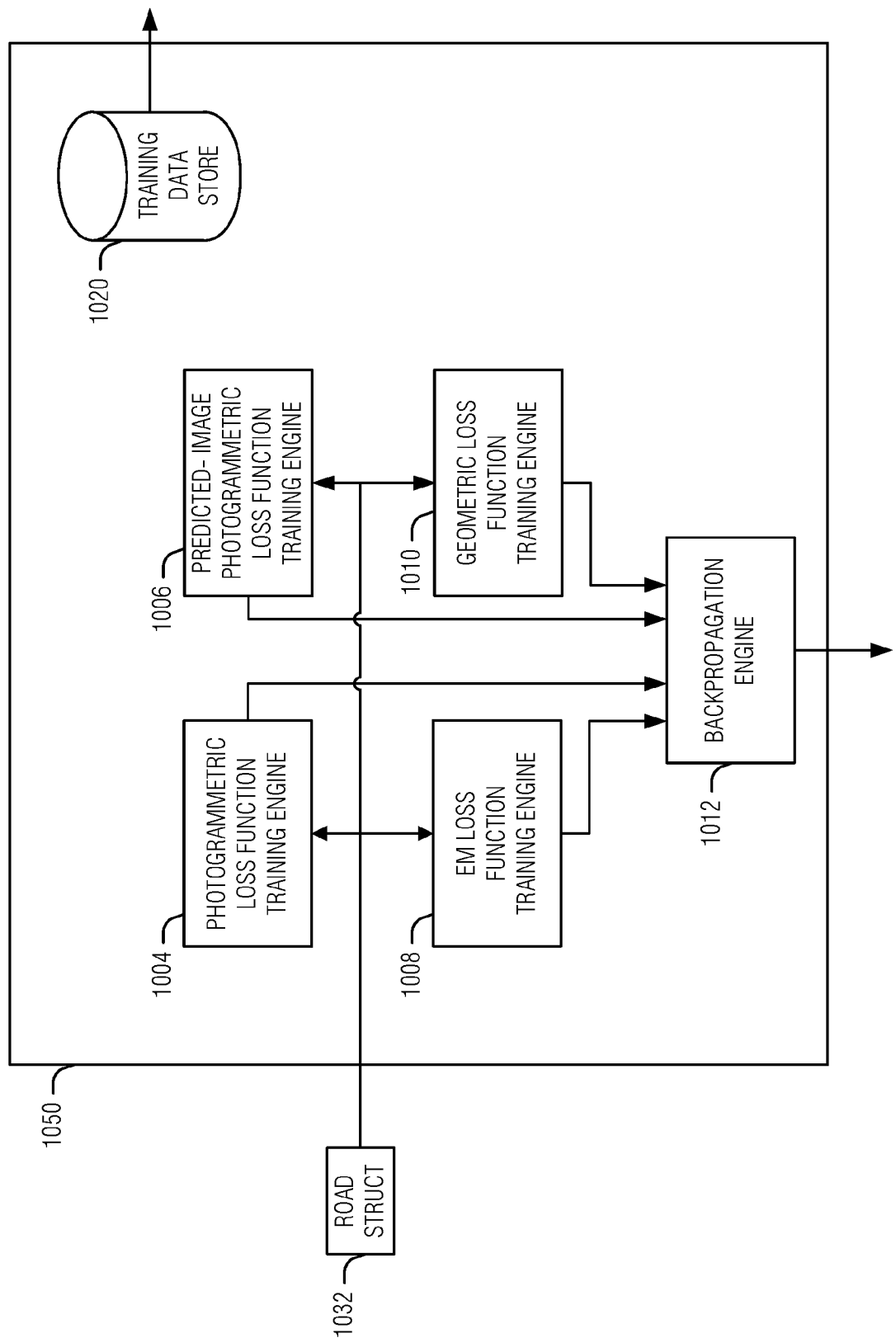
FIG. 10 illustrates an example of a multi-modal loss function application engine, according to an embodiment.

FIG. 10 illustrates an example of a multi-modal loss function application engine 1050, according to an embodiment. Multi-modal loss function application engine 1050 may be an instance of multi-model loss function application engine 950 of FIG. 9. In the example depicted, the multi-modal loss function application engine 1050 includes four distinct loss function training engines: a photogrammetric loss function training engine 1004, a predicted-image photogrammetric loss function training engine 1006, an EM loss function training engine 1008, and a geometric loss function training engine 1010. In addition, the multi-modal loss function application engine 1050 includes a backpropagation engine 1012, and a training data store 1020. The loss function training engines 1004-1010 are configured to compare a road structure 1032 against corresponding reference criteria, which are used in place of traditional "ground truth" values, to ascertain the error, or loss, in the accuracy of the road structure 1032.

In an example, actual ground-truth data (as in a traditional supervised machine-learning system) is not used. Instead, the images of training data are processed, along with additional available data such as ego-motion corresponding to the images, camera height, epipole, etc., to produce the reference criteria for evaluation of the loss functions. In a sense, because the reference criteria are based on the training data, this may be considered to be a type of unsupervised learning. For example, the gamma output of the DNN together with the ego motion computed from the images can be used to warp one image to the second and compared. Differences between the warped first image and the unwarped second images indicate possible errors in the gamma and can be used as a loss function.

In an example, ground-truth data is available for the training data. As an example, ground-truth data may be provided by an additional measurement modality, such as three-dimensional imaging or scanning measurements (e.g., stereoscopic imaging, LiDAR scan, etc.). Accordingly, one or more loss functions may be based on the actual ground truth to provide a type of supervised learning.

The loss function training engines 1004-1010 may each contribute a component of an overall loss function used to train the DNN. The backpropagation engine 1012 may be configured to compute partial derivatives of the overall loss function with respect to variable computational parameters (e.g., weights, biases) to determine a direction of adjustment for each respective operational parameter using a gradient-descent technique. The backpropagation engine 1012 may apply the updated computational parameter values at each successive layer along the backward propagation path. The training data store 1020 may contain the training data, the image-formatted motion indicia, and the image-formatted epipole indicia to be applied to the appropriate input layer(s) of the DNN. In an example, the loss function is defined in terms of Tensor Flow primitive functions including complex combinations of such primitives. Once the loss is defined in this way, Tensor Flow may be used to compute the partial derivatives. This is the current standard method using tools such as Tensor Flow. Other optimization techniques can be used.

The photogrammetric loss function training engine 1004 is configured to generate reference criteria based on the set of image frames from the training data that were provided to the DNN in a forward propagation path. In an example, where a trio of images (current, previous, and previous-previous) is used as the input to the DNN, the gamma map produced as the road structure 1032 is used to warp the previous, and the previous-previous, images to the current image. Each warped image is corrected to compensate for the residual flow and is compared against the actual current image.

The residual-flow compensation may be determined according to $$\mu = \frac{-\gamma * \frac{T_Z}{camH}}{1 - \gamma * \frac{T_Z}{camH}} * (\vec{p} - \vec{e})$$

where μ represents the residual flow, γ (gamma) is the road structure, the term $$\frac{T_Z}{camH}$$

represents the forward-direction ego-motion divided by the camera height, and the term $(\vec{p}-\vec{e})$ describes the plane of the road surface.

The image comparison may be computed using a suitable technique, such as normalized cross-correlation, summed absolute differences (SAD), binary descriptors distance, or the like, which may be applied to a patch of the image surrounding each pixel, according to:

$$compareImages\left(I_{curr}, I_w\{\mu_{\bar{e}, \frac{T_Z}{camH}}(\gamma), I_{baseline}\}\right)$$

where $I_{curr}$ is the un-warped current image, $I_w$ is the gamma-warped and residual flow-compensated previous (or previous-previous) image, and $I_{baseline}$ is the previous (or prev-prey) image before warping. In an example, object detection (e.g., vehicle detection, bicycle/pedestrian detection) is used to mask moving objects from the loss function to reduce detected motion between the compared images. The image comparison may include gray-level comparison between images.

In an example, the photogrammetric loss function training engine 1004 applies variable weighting to portions of the image comparison that correspond to road, and non-road features. Accordingly, the degree of differences between compared images found in non-road portions may be discounted.

The loss function components contributed by two or more of the loss function training engines 1004-1010 are combined by the backpropagation engine 1012 into an aggregated multi-modal loss function that is used to train the DNN, for example, using a gradient descent technique to generate computational parameter adjustments.

In an implementation, a number of images are captured by a monocular imaging system, where the images include a current image and one or more future images or one or more past images. In such an implementation, the predicted-image photogrammetric loss function training engine 1006 is configured to perform a similar image warping, compensation, and comparison technique as the photogrammetric loss function training engine 1004, except that, in addition to using images that the DNN used to produce the road structure 1032, one or more "future" or "past" image(s) are included in the image-comparison processing. "Future" images are images that were captured later than the current set of images that are being used to train the DNN, and "past" images are those which were captured earlier. Accordingly, for future images, the loss function component provided by the predicted-image photogrammetric loss function training engine 1006 uses training data that is not available at run-time. Notably, the computed inference produces a gamma that works on images that the inference does not see as input.

The EM loss function training engine 1008 is configured to produce a loss function component based on comparing the road structure 1032 against "future" ego-motion representing the passage of the vehicle over the portion of the road corresponding to the road structure 1032. As an example, ego-motion indicative of a bump or hole in the road, in the absence of any indication in road structure 1032 of any bump or hole, is a loss. In an example, upward or downward curvature may be used. In an example, EM may be extended over 20 m (e.g., up to 50 m). This may assist the DNN to properly model the long-distance shape of the surface from road structures even when parts of the road are too far away to calculate residual flow. Similarly, an absence of any ego-motion corresponding to a bump or hole, while the road structure 1032 predicts a bump or hole at that location (particularly, in the path of the vehicle's wheels), constitutes loss.

In an example, a low-pass filter or a damped-spring model with a 0.5 Hz frequency is applied to the road structure 1032 to model the damping effect of the vehicle's suspension as the vehicle passes over topography of the road. In another an example, where the suspension state of the vehicle is available, suspension information is considered together with the ego-motion to more accurately measure the vertical motion of the vehicle's wheel.

The geometric loss function training engine 1010 is configured to produce a loss function component using one or more sets of "future" training data including "future" image frames and corresponding "future" ego-motion. The "future" image frames represent captured images at a defined distance or time step ahead of (at a greater distance from or captured later than) the current image frames used as input. For example, the "future" image frames and ego-motion may correspond to the next subsequent trio of captured images of training data. In another example, the "future" image frames and ego-motion correspond to 5 meters, 20 meters, or some other defined distance from the vehicle's position.

The reference criteria are based on a "future" road structure (e.g., gamma map), which is computed using the DNN. The geometric loss function training engine 1010 uses the "future" ego-motion to warp the "future" road structure to the current road structure 832, or to warp the current road structure 1032 to the "future" road structure using the "future" ego-motion.

In an example, the "future" road structure is warped to the current road structure 1032, and a first comparison is made therebetween, and the current road structure 1032 is warped to the "future" road structure, and a second comparison is made therebetween. The results of the first and the second comparisons may be combined (e.g., averaged) to produce an aggregated comparison, which is then used to determine the loss function for the geometric loss function training engine 1010.

In another example implementation, where multiple cameras and overlapping fields of view are used, the related images from multiple views may be used to achieve geometric loss function training. For example, the "future" left and center images (at time t3) may be processed with a requirement that the gamma-warped images from time t3 are similar photometrically to center image at time t2. A future two pairs of images may be used to set the condition that the gamma inferred from those images is similar, after correcting for camera motion, to the gamma derived using images from times t1 and t2. In an example, a center main camera may be used together with one or more cameras mounted on the left or right corners of the vehicle roof which look forward and to the side. These side cameras may have a field-of-view wider than 90 degrees. The right camera field-of-view may significantly overlap the right field-of-view of the main camera and may have a field-of-view that extends backwards. The left camera may have a field-of-view that significantly overlaps the left field-of-view of the main camera and may have a field-of-view that extends backwards. This arrangement of cameras is shown in FIG. 22, where camera 2212B is the main camera, and cameras 2212A and 2212C are respectively the left and right-side cameras. In an example, images from the corner cameras may be used in the training stage to compute the loss function without being used in the inference stage.

In another implementation, a neural network may be trained using two losses: a photometric loss and a geometric loss. A loss is understood to refer to a difference between two measurements. In general, neural networks are trained (e.g., optimized) to minimize losses.

The geometric loss is treated the as described above. The photometric loss is based on five components:

a. A current image frame;
b. The 3D information output for each pixel in the current image frame;
c. A second image frame that shares some part of the scene visible in the current image frame;
d. The rotation and translation (RT) that describes the difference between the two frames' locations in the world; and
e. A reasonable road plane that describes the road area seen by both frames.

Using the RT, the road plane, and the 3D information, the current frame is re-drawn using pixels from the second frame. If the RT and the 3D information are perfect (the plane may only be a reasonable guess) most of these rendered images will be essentially identical (e.g., 99% of the pixels are within a threshold distance of each other, the threshold defining a tolerance for being considered the same). If the 3D information is not perfect, then the flaws in the 3D information will be re-drawn incorrectly, and that part of the re-drawn image will not match the current frame. For training, the neural network is reinforced (e.g., rewarded) for the patches in the redrawn image where the current frame and the rendered frame match well, and punished for patches that do not match well. Over time, the neural network converges to output accurate 3D information on the scene.

A monocular training system from may perform this operation with five different alternative frames to calculate the photometric loss. The five frames are all from the same camera as the current frame (e.g. the main camera 2200B in FIG. 22) and they all fell within six meters of the current frame, taken both before and after time the current frame was captured. Because only the loss was considered, training images from the future (as measured from the current frame) may be used even though they are unavailable at inference time (e.g., when used during driving as opposed to training).

The multi-camera technique incorporates two additional frames in addition to the current frame and two previous-in-time frames to the current frame, similar to the five-frame implementation, but exchanges the future frames with frames taken from different cameras, such as the Front Corner Left and Front Corner Right cameras (e.g., camera 2200A and 2200C in FIG. 22). Everything described above in the computation of the photometric loss for images from the same camera applies in this case as well because they are frames covering at least a portion of the same scene as the current frame, separated by some RT. Accordingly, all of the calculations used for the single-camera multiple-frame mechanism also work in this case with multiple images from multiple cameras—with one exception. In the case of the five frames used in the monocular technique, with the images were taken at five different times, none of which was the same time as the current frame, moving objects did not present accurate measurements of photometric loss. Consequently, while objects like trees give accurate information to the photometric loss because they remained static, moving cars or pedestrians did not and had to be masked out.

In the improved multi-camera process, different cameras are synchronized, in time, with each other. Thus, the two additional frames are taken at the same time as the current frame. As noted above, if two images separated by some RT from the same time are used, then moving objects are no longer moving. Now everything is fixed, and the equations work on moving objects as well as fixed objects. To fully use the equations, we need to accurately determine the RT the cameras (e.g., stereo calibration). One such implementation is described below.

Figure 11:
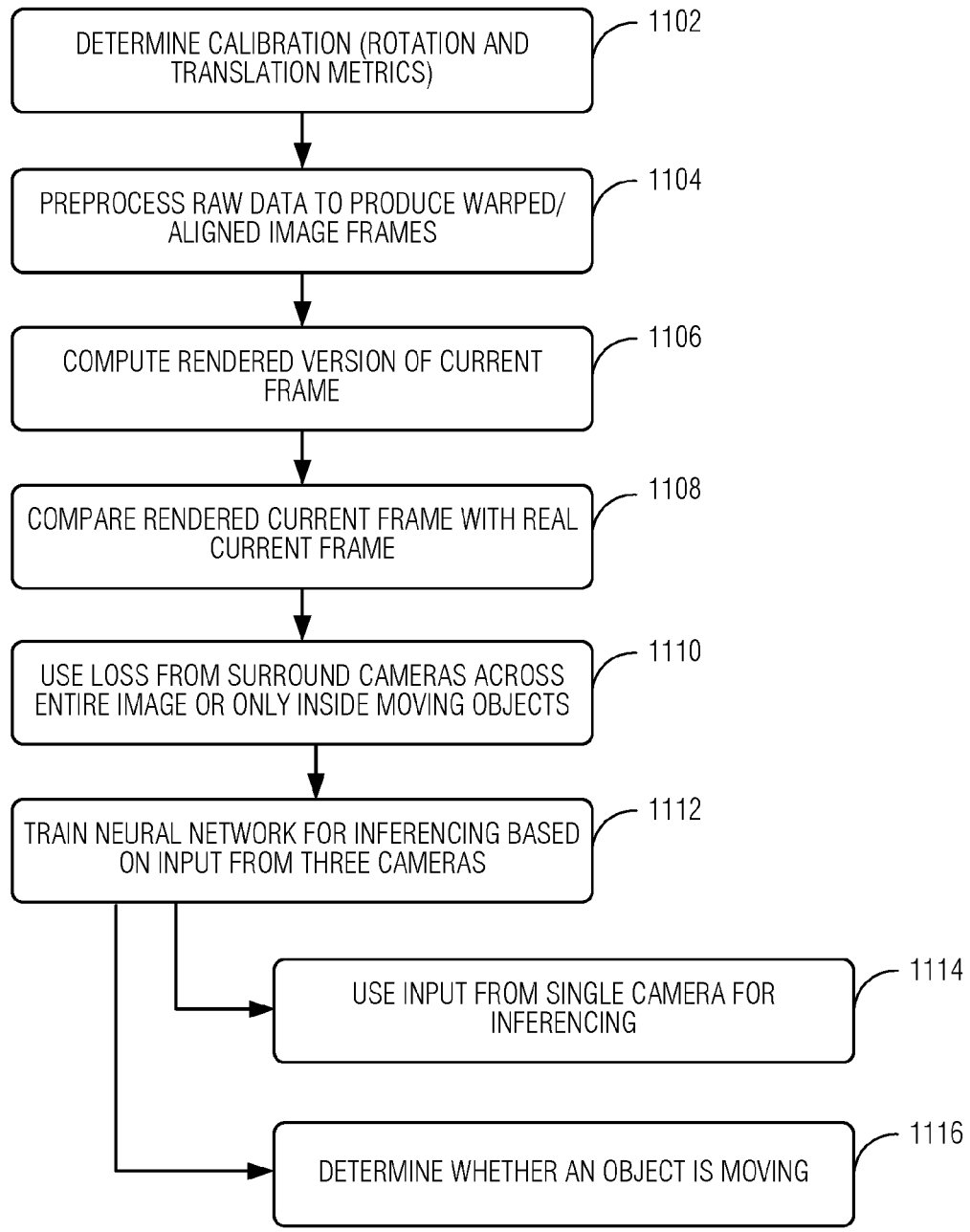
FIG. 11 is a flow diagram illustrating an example of a method for training a neural network, according to an embodiment.

FIG. 11 is a flow diagram illustrating an example of a method 1100 for training a neural network, according to an embodiment. The operations of the method 1100 are performed by computational hardware such as that described above or below (e.g., processing circuitry). The following operations may be employed to use multiple-camera angles at a point-in-time to train a neural network to model a 3D environment.

At operation 1102, calibration (e.g., RT) is determined between cameras providing the images. Rolling shutter cameras add complications because the effect of rolling shutters tends to be greater when two cameras with different pitches relative to the road plane are used. Accordingly, while the rolling shutter may be ignored with the photometric loss in the monocular multiple-image implementation, ignoring it here may be problematic. To adjust for rolling shutter, some initial understanding of the 3D information visible in frames from the corner cameras is used to re-draw the rolling shutter images as global shutter images. For example, rolling shutter correction using 3D information of the scene, exposure time for each row of pixels, and ego-motion of the camera around a timestamp. This may be accomplished with relatively naive 3D information, such as an assumption that all pixels are on the plane, or with much richer 3D information, like training a different parallax model on that camera and using its output for this correction. Another examples of ways to solve the camera calibration is described in U.S. Patent Publication No. 2014/0198184A1. Note that if the rolling shutter images are not redrawn as global shutter images, as described above, then the rolling shutter may be corrected later, for instance, using ego-motion, exposure time per row, and the 3D information from the output of the neural network.

At operation 1104, the images from the left and right cameras may be warped to the current frame using the plane and RT (e.g., a homography). At operation 1106, in the loss computation, a new version of the current frame may be rendered using the pixels from the warped side frame and the 3D information from the neural network. The result may be compared to the real current frame (e.g., from the main camera) to ascertain the degree to which portions of the two match one another (operation 1108).

Next, at operation 1110, two paths may be followed. The loss from the surround cameras across the whole image may be used, or the loss from the surround cameras may be used only inside of moving object masks.

The operations above may be used in several ways. For example, in operation 1112, a neural network may be trained for inferencing based on input from the three cameras, the training using the loss as described above.

In another example, at operation 1114, input for the inferencing is from a single camera, (e.g., three frames from the main camera), and the surround images are used just for the photometric loss during training. In this example, the neural network works in the field when only the main camera is available, and the in-vehicle architecture is the same as in previous implementations. Accordingly, the computation efficiency (e.g., cost) on the chip is the same. However, the neural network has now learned how to output reasonable 3D information on moving objects as well.

In operation 1116, in addition to providing the 3D information on all objects, moving and not moving, this combination of losses may be used to output a mask indicating which pixels in the image are part of a moving object and which are not. This may be accomplished by adding another channel to the output of the neural network. Thus, instead of just producing 3D information for each pixel in the image, a moving/not-moving prediction (e.g., between zero and one) is also provided for each pixel.

To train the neural network to provide this output, the neural network is provoked to infer how much the loss between the original five images from the main camera (e.g., the monocular technique described above) and the loss from the surround cameras differ. Because relatively big differences (e.g., as measured via ratios of differences) between the loss from surround cameras and from the main camera will happen in areas where objects are moving, large variations are encouraged to produce larger values in the additional output channel. These values may then be used as a moving vs. not moving mask.

There are other advantages to using stereo information from the surround cameras. For example, it may be more accurate at gauging the 3D shape of objects at a distance because of the relatively wide baseline between the surround cameras when comparted to a single camera. Furthermore, certain textures—such as solid road marks (e.g., lines) give depth information primarily when the camera image motion is lateral. Thus, these solid road marks are often poor at providing depth information to a monocular camera in-line with the road mark, whereas the surround cameras may use solid road marks quite effectively because of the two different angles to the solid road mark.

Figure 12:
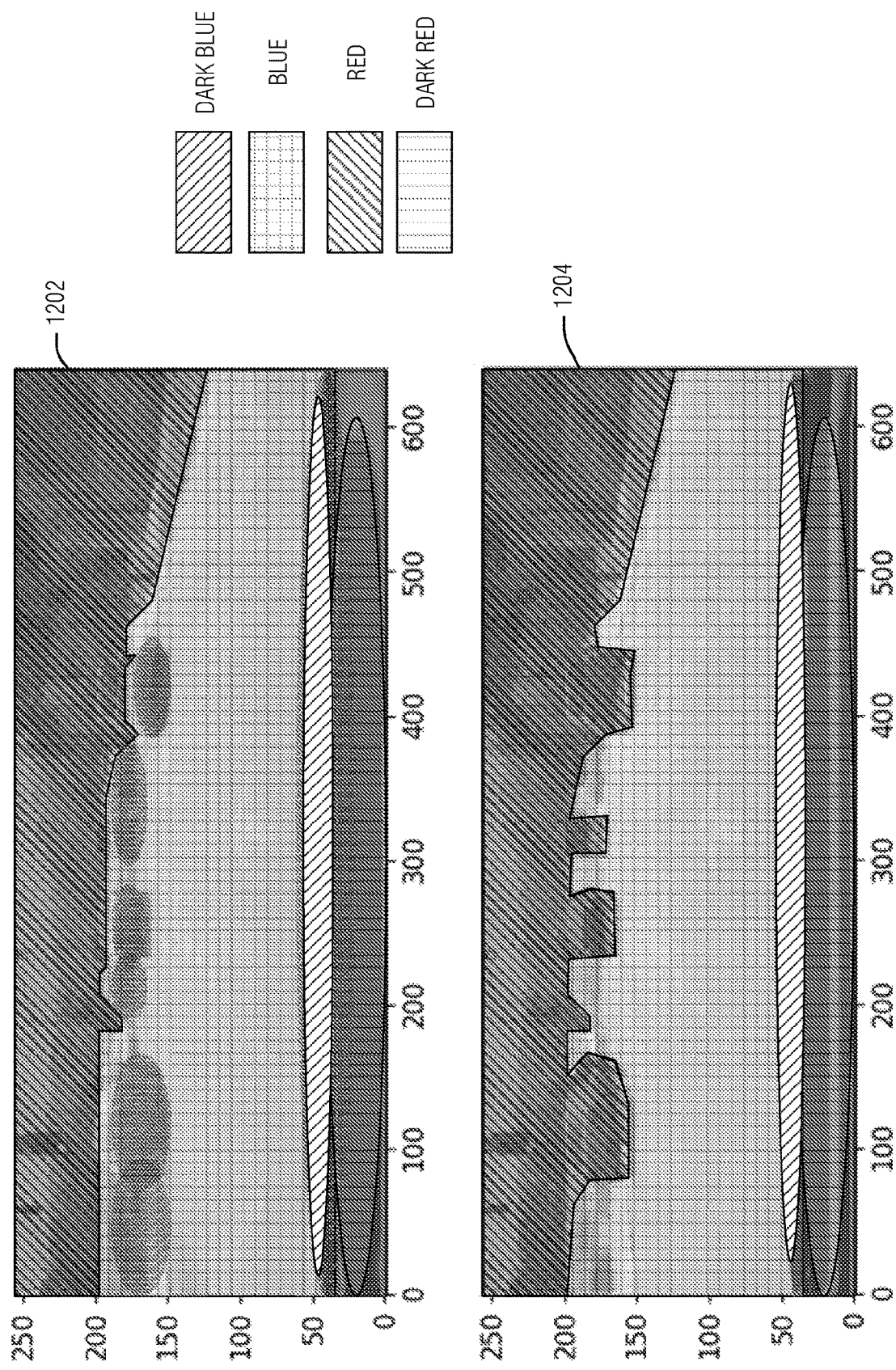
FIG. 12 illustrates the differing outputs from the two neural networks trained via the monocular and surround cameras described herein.

FIG. 12 illustrates the differing outputs from the two neural networks trained via the monocular and surround cameras described herein. Image 1202 is the output of a neural network trained with the monocular technique. Here, the colors represent a height above the road plane. The colors move from blue (the bluest is 20 centimeters or more below the road plane) to red (the reddest is 20 centimeters or more above the road plane). Note that the moving vehicles are ignored (e.g., erased), and also that they are even generally associated with a bluer hue than the road, indicating a depression.

Image 1204 is the output of a neural network trained with the surround (e.g., stereo) technique. Note the contrast between this image and the last. Gone are the erroneous indications of depression around the vehicles. Rather, reasonable height estimates for the moving objects are provided.

Figure 13:
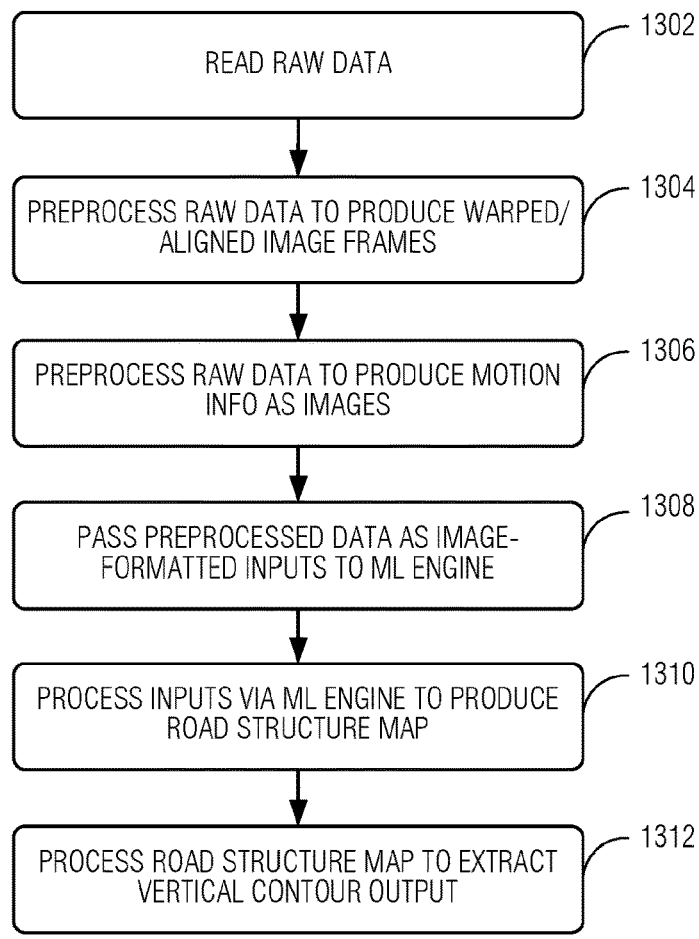
FIG. 13 is a flow diagram illustrating an example of a method for operating a vertical contour detection engine, according to an embodiment.
Figure 14:
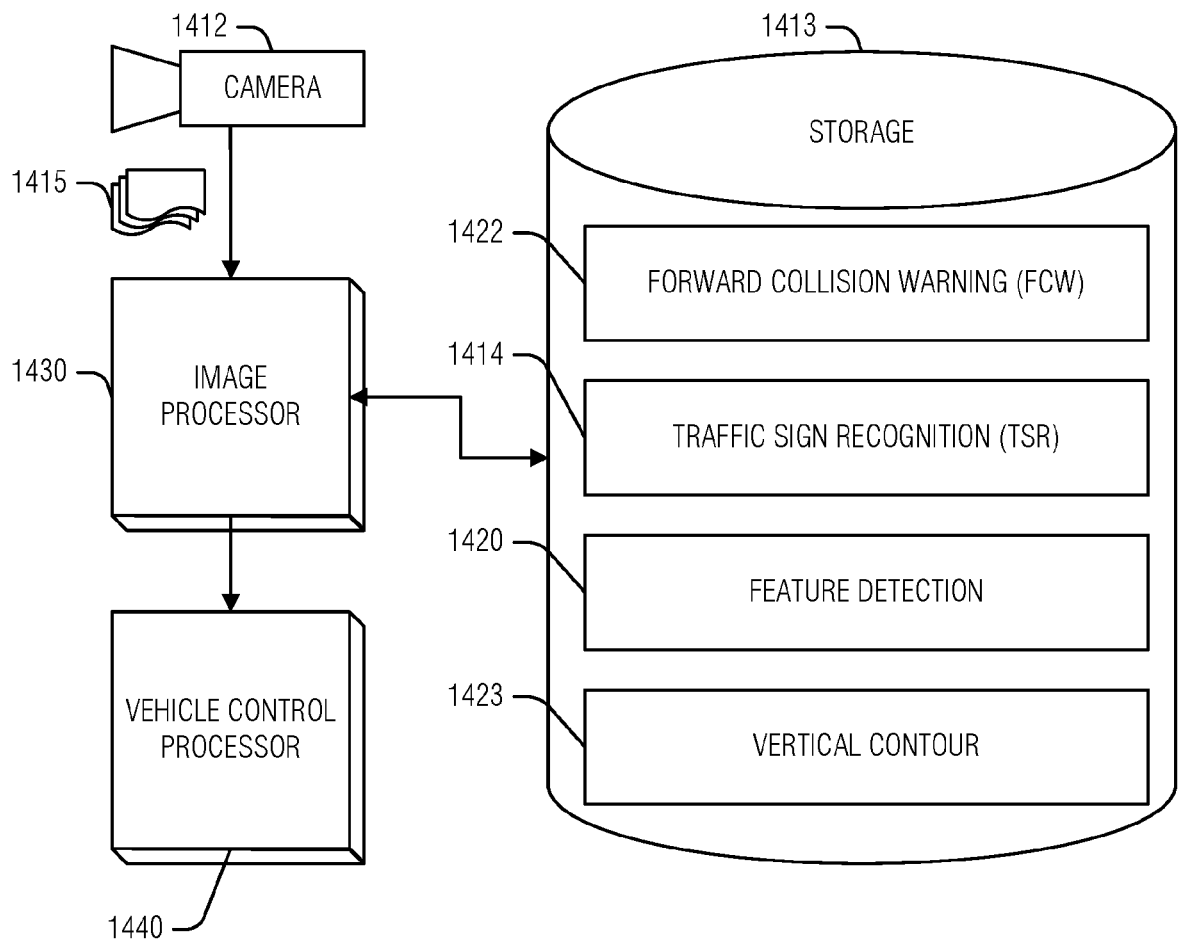
FIG. 14 illustrates a camera-based vehicle mounted system for profiling a road, for use with an autonomous vehicle control system, according to an embodiment.
Figure 15:
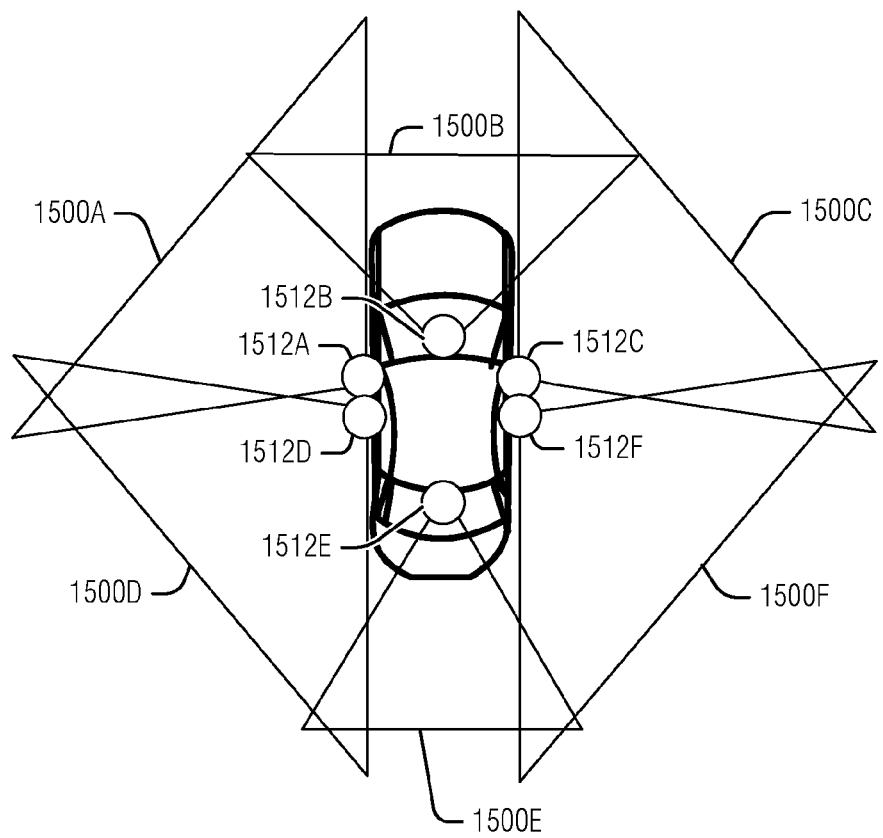
FIG. 15 illustrates a multiple-camera array on a vehicle, according to an embodiment.
Figure 16:
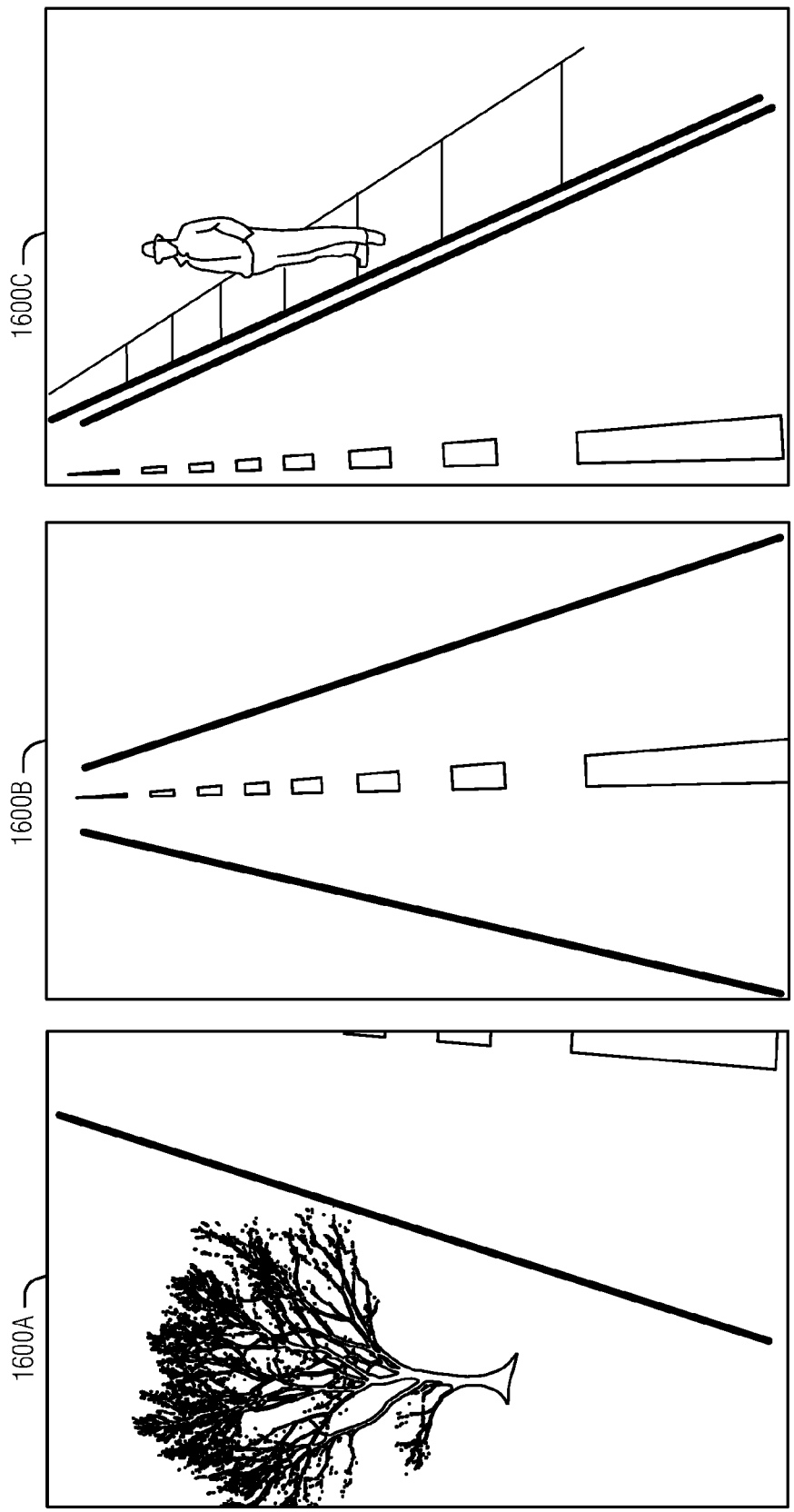
FIG. 16 illustrates examples of fields of view that may be captured by a multiple-camera array, according to an embodiment.

FIG. 13 is a flow diagram illustrating an example of a method 1300 for operating a vertical contour detection engine, according to an embodiment. The operations of the method 1300 are performed by computational hardware such as that described above or below (e.g., processing circuitry).

At operation 1302, raw data, including a sequence of two or more image frames, ground plane, and ego-motion data, as well as camera height information, is obtained (e.g., read or received). The image frames may include a current (e.g., most recently captured) image, and one or more previously-captured images. Image frames may also include left, right, center images that are captured at the same time.

At operation 1304, the raw data is processed to determine a homography among the sequence of image frames with respect to the road plane. Some of the image frames may then be warped to align the road plane with another image frame of the sequence. The warping may be based on measured ego-motion and properties of the ground plane according to an example. The ego-motion may be measured motion, or it may be computationally determined from contents of the image frames. The warped image frames may include the current image frame, and one or more prior image frames warped to correspond to the current image frame. In another example, the current image frame, and one or more other frames, are warped to correspond to a non-warped earlier image frame.

In an example, the images are corrected for lens distortion, such as radial lens distortion, prior to being used by the DNN. This correction avoids training the DNN on a particular lens. Also, notably, focal length is not a component of the equation for gamma, allowing train on images from multiple different camera types.

At operation 1306, additional raw data is processed, including ego-motion data, ground plane data, and camera height data, to produce motion information (e.g., epipole). This information is then formatted as one or more images (operation 1308).

At operation 1310, the DNN is used to produce an inference. The DNN may perform convolution, non-linear activation, and pooling operations. In an example, de-convolution and un-pooling operations are performed. At various layers, trained computational parameters, such as weights or biases, are applied by operation of the DNN according to the pre-established training of the DNN. Operation of the DNN in inference mode produces a road structure map such as a gamma map as described above. Using such as DNN is capable of producing topography measurements that are accurate to within one centimeter (1 cm), or even half of a millimeter (0.5 mm) out to ten meters (10 m) from the vehicle while traveling up to fifty kilometers per hour (50 km/h or about 31 miles per hour).

At operation 1312, road contour information is extracted from the road structure map. Additional information may also be extracted from the road structure map, such as residual flow information, which may be further processed for related applications.

The road contour information may be passed to an autonomous or semi-autonomous vehicle control system that automatically adjusts some aspect of vehicle operation. For instance, a suspension control system may dynamically adjust the vehicle's suspension based on vertical contour data representing the vehicle's anticipated driving path. The suspension adjustment may involve dynamically varying stiffness of the suspension or varying the height of individual wheels to conform to the vertical contour of the road.

In an example, the road contour information may be passed to a driving policy system. The driving policy system may use an environmental model to determine future navigational actions. The driving policy system may use the road contour information to select or determine navigational actions. An example of a driving policy system is RSS, which is described, for example, in International Application Publication No. WO2018/001684, which is hereby incorporated into the present application in its entirety.

Figure 21:
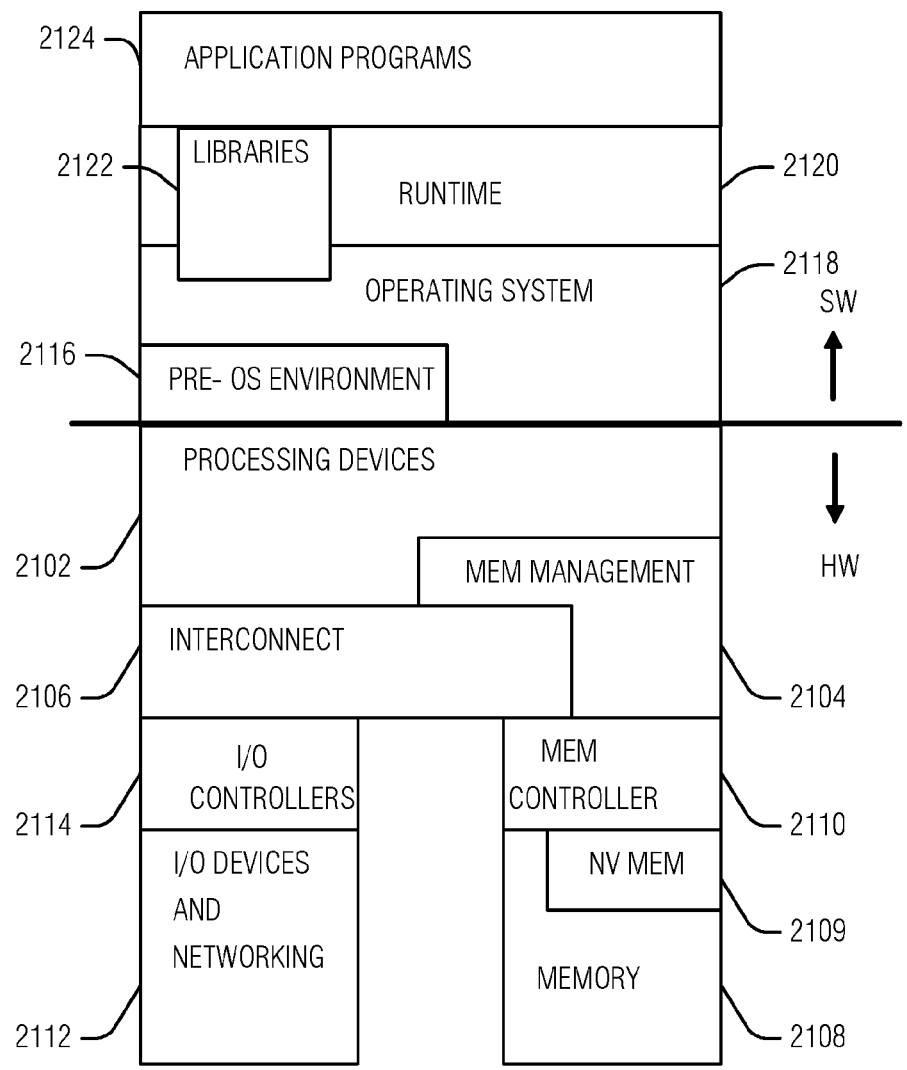
FIG. 21 is a diagram illustrating example hardware and software architecture of a computing device according to an embodiment.

FIG. 21 illustrates a camera-based vehicle mounted system for profiling a road, for use with an autonomous vehicle control system, according to an embodiment. As illustrated, the system is composed of a number of subsystems, components, circuits, modules, or engines, which for the sake of brevity and consistency are termed engines, although it will be understood that these terms may be used interchangeably. Engines are realized in hardware, or in hardware controlled by software or firmware. As such, engines are tangible entities specially-purposed for performing specified operations and are structured in a certain manner.

In an example, circuitry may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a tangible machine-readable storage medium. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

As depicted, the system includes a camera or image sensor 2112 mounted in or on vehicle. Each image sensor 2112 images a field of view, to provide image frames 2115, which are read by the image processor 2130. In an example, more than one camera 2112 may be mounted in the vehicle. For example, the system may have multiple cameras 2112 pointing in different directions. A system also may have multiple cameras 2112 pointing in the same or similar directions with respect to the vehicle but mounted at different locations. In an example, a system may have multiple cameras that have partially or completely overlapping fields of view (e.g., as described below with respect to FIGS. 22 and 23). In an example, two side-by-side cameras may operate in stereo. Although single-camera systems are discussed herein, multiple-camera systems may also be used, where some or all of the relevant images and frames may be captured by different cameras, or may be created from a composite of images captured from multiple cameras. Real-time operation, in the present context, operates with imperceptible or nominal processing delay such that objects throughout a field of view are detected at a rate that is consistent with the rate at which the field of view is scanned or captured.

Image processor 2130 may be used to process image frames 2115 simultaneously or in parallel to serve a number of driver assistance systems or applications. Image processor 2130 may be used to process image frames 2115 to detect and recognize an image or portions of the image in the forward field of view of camera 2112. The driver assistance systems may be implemented using specific hardware circuitry (not shown) with on board software and/or software control algorithms in storage 2113. Image sensor 2112 may be monochrome, grayscale, or image sensor 2112 may be color sensitive. By way of example, image frames 2115 are used to serve feature detection engine 2120, traffic sign recognition (TSR) engine 2121, forward collision warning (FCW) engine 2122, and vertical contour detection engine 2123 of the vertical contour of the road or deviation from the road plane. In an example, image frames 2115 are partitioned between different driver-assistance applications and in other cases the image frames 2115 may be shared between the different driver assistance applications.

In an example, the system is used to accurately estimate the planar (or bi-quadratic) model of the road surface, and compute small deviations from the planar (or bi-quadratic) road surface model to detect or quantify various surface features 104. The term "road surface model" in the present context refers to a planar or bi-quadratic model of the road surface. The term "vertical contour" or "vertical deviation" refers to the deviations from the road surface model along an axis perpendicular to the road surface.

In an example, the system is used to accurately detect model a road surface (e.g., shape) shape, such as vertical contour, using the camera 2112 mounted in a host vehicle. Using systems and methods provided herein, surface features such as bumps or holes, speed bumps, curbs, or manhole covers, may be measured or modeled as vertical deviations from the road surface (e.g., plane) with sub-pixel accuracy (e.g., on the order of 1-2 centimeters). These techniques may be similarly applied to forward, sideward, or rearward cameras 2112. The gamma map may be useful for determining drivable areas in front of, or to the sides and rear, of the vehicle. The gamma map may be used on its own to determine places where the surface slope is too steep to drive, or it may be combined with grayscale or color image based semantic free space, as described in U.S. Patent Publication No. 2018/0101177, the entirety of which is incorporated herein by reference. The gamma map, or height map, of the road plane may be used to differentiate between sharp vertical edge curb stones, smoothly sloping curb stones, or soft shoulders (e.g., where a road drops off). The host vehicle may then be controlled to maintain a larger distance from a sharp curb stone or edge drop off than from a smoothly sloping curb stone.

In an example, the system may further include a vehicle control processor 2140 that implements one or more vehicle control engines for generating throttle, braking, steering, or transmission selection commands to the vehicle's electro-mechanical actuator systems to effect autonomous or semi-autonomous driving operations. The vehicle control processor 2140 may receive various outputs supplied by the image processor 2130 pertaining to the various machine-vision assessments produced by engines 2120-2123.

FIG. 22 illustrates a multiple-camera array on a vehicle, according to an embodiment. As depicted, cameras 2212A-2212F are positioned around a vehicle to provide fields of view (e.g., such as those described below).

Figure 23:
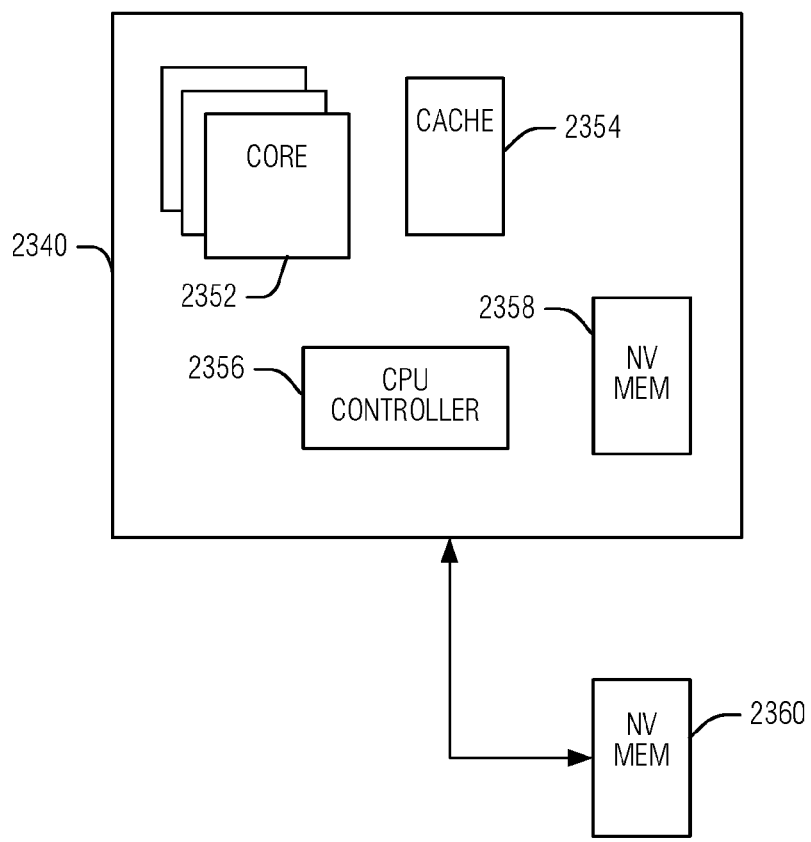
FIG. 23 is a block diagram illustrating example components of a central processing unit according to an embodiment.

FIG. 23 illustrates examples of fields of view that may be captured by a multiple-camera array, according to an embodiment. Multiple overlapping fields of view 100A-100F are illustrated. Here, the road surface is common to the views.

Figure 17:
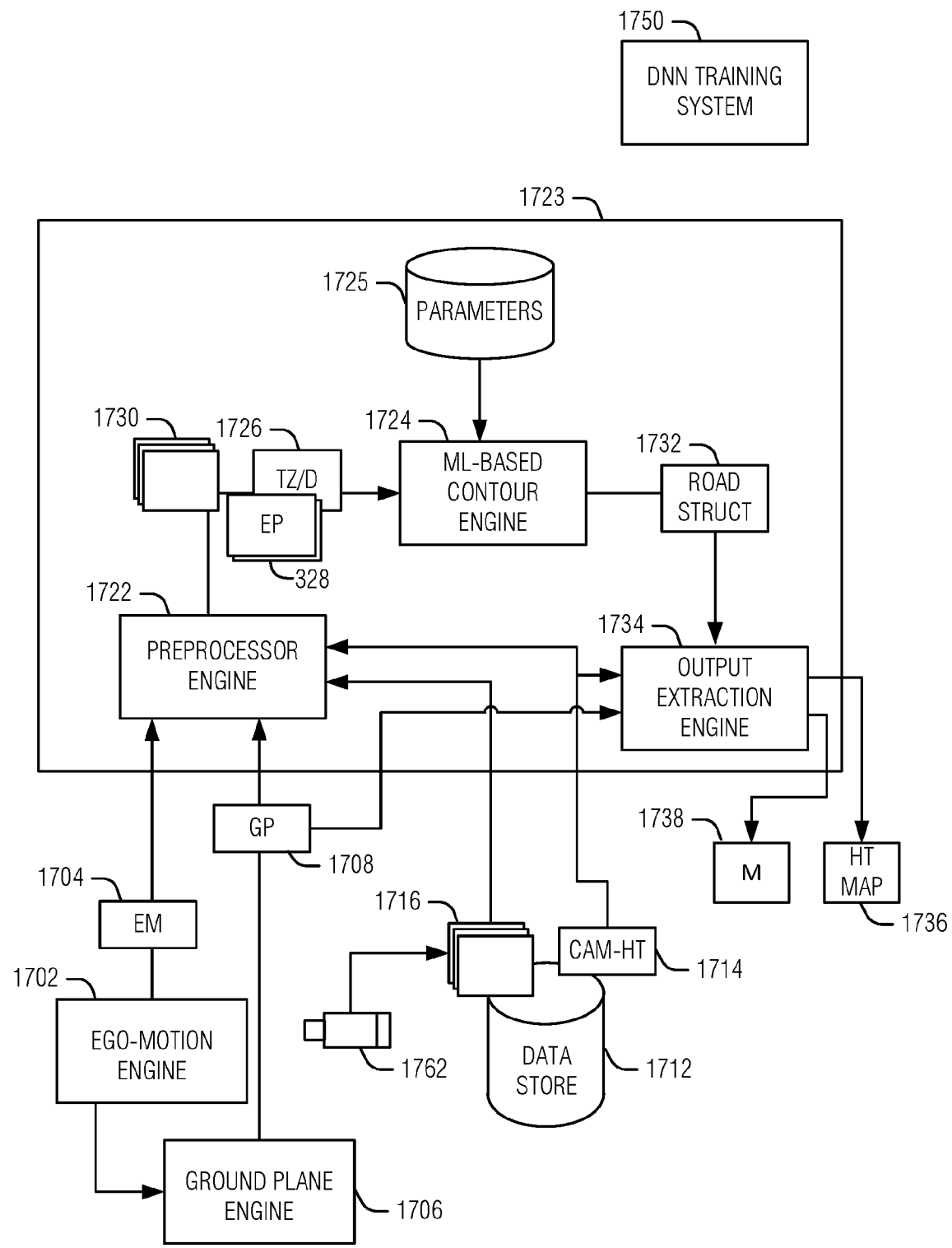
FIG. 17 is a block diagram illustrating an example of a vertical contour detection engine, according to an embodiment.

FIG. 17 is a block diagram illustrating an example of a vertical contour detection engine 1723, according to an embodiment. The vertical contour detection engine 1723 includes a preprocessor engine 1722, a machine-learning (ML)-based contour engine 1724, and an output extraction engine 1734. The preprocessor engine 1722 is constructed, programmed, or otherwise configured, to receive a set of raw input data, and process the set of raw input data to produce a preprocessed set of input data to be passed to ML-based contour engine 1724 for further processing, the result of which is an output indicating a measurement of the vertical contour of the road surface.

The set of raw input data may be provided from components of a vehicle control system. For example, an ego-motion engine 1702, a ground plane engine 1706, or a data store 1712 may each provide various items of raw data. Notably, in the present context, the term "raw data" refers to information on the input side of preprocessor engine 1722. Raw data is not limited to data provided directly from sensors (e.g., one or more cameras) or is otherwise unprocessed. Rather, raw data may be computationally processed to some extent by its source or by an intermediary processing entity.

The ego-motion engine 1702 is configured to provide ego-motion (EM) information 1704 describing actual motion of the sensor. EM information 1704 may be based on measurements obtained by the vehicle's speedometer, or inertial sensors (e.g., a tri-axial accelerometer configured to sense the yaw, pitch, and roll of vehicle 218). The inertial sensors may be integrated in a camera or may be mounted elsewhere on or in the host vehicle.

The ground plane engine 1706 is configured to provide ground plane (GP) information 1708. In an example, the ground plane engine 1706 may determine the GP information 1708 based on pitch and roll data provided by the ego-motion engine 1702, vehicle suspension information, or some combination of these inputs. The GP information 1708 may indicate the plane normal vector of the road, and the distance to the plane. In an example, the ground plane engine 1706 may compute the plane normal vector and distance to the plane based on 3D scanning measurements (e.g., LiDAR), stereoscopic imaging, or other suitable technique(s). In an example, the ground plane engine 1706 may compute the GP information 1708 based on the captured images 1716, or it may be a fixed default GP.

The data store 1712 provides saved items of data, such as camera height information 1714, and captured images 1716, which may include the sequence of successively-captured image frames 215. The captured images 1716 may include the current (most recently captured) image, the previous image, and the previous-previous image, for example.

The preprocessor engine 1722 outputs a set of preprocessed images 1730 that are based on the captured images 1716 and other items of raw-data inputs, such as the EM 1704, the GP information 1708, or the camera height information 1714. In addition, the preprocessor engine 1722 outputs the image-formatted epipole indicia 1728, and the image-formatted motion indicia 1726, for further processing by the ML-based contour engine 1724. The preprocessor engine 1722 may also adjust images captured with rolling shutter.

In an example, the road structure 1732 is a map that represents a ratio of road plane height to distance from the camera along the direction of forward motion (along the z axis) for each pixel of the current captured image, referred to herein as "gamma." In an example, gamma may have a resolution that is the same, or similar, to any of the set of preprocessed images 1730, or it may have a different (e.g., reduced) resolution.

In an example, the ML-based contour engine 1724 reads the set of preprocessed images 1730, the image-formatted epipole indicia 1728, and the image-formatted motion indicia 1726, and processes these image-formatted outputs of the preprocessor engine 1722 to produce the road structure 1732, which is an image-formatted map representing a three-dimensional structure of the road surface. The road structure 1732 is indicative of the vertical contour of the road. It may include height information for points on the road surface, or it may include other values from which the height information may be computationally determined from further processing.

In an example, the ML-based contour engine 1724 includes a trained deep neural network (DNN) to compute the vertical contour of the road. The DNN performs various staged operations at a plurality of layers based on computational parameters 1725, which include weighting, biases, or other variable settings specific to each layer. The computational parameters 1725 may be established, and occasionally updated, based on DNN training operations, which may be performed off-line or remotely, such as by DNN training system 1750. Training may be accomplished using the techniques described herein.

The output extraction engine 1734 is configured to process gamma ($\gamma$) values of the road structure 1732 to produce a height map 1736 representing the vertical height from the plane of the road using the camera height information 1714 and the GP 1708, for example. In an example, the output extraction engine 1734 is configured to compute residual motion $\mu$ 1738 from the road structure 1732 based on the following:

$$\vec{\mu} = \frac{H}{Z}\frac{T_Z}{D}(\vec{e} - \vec{p_w}),$$

where the $$\frac{H}{Z}$$

term is gamma, $T_z$ represents translation in the forward direction, D represents the camera height 1714, $\vec{e}$ represents the epipole information, and $\vec{p_w}$ is a term representing the corresponding image coordinate after application of the homography-based warping.

In an example, the DNN produces a pixel-wise output of gamma values, where gamma is a computed ratio of vertical contour height to distance from the camera along the direction of forward motion (along the z axis). The vertical contour height may be determined from the respective gamma value for the corresponding location within the image.

In an example, road-boundary features such as sidewalks may be detected directly from the height H. In an example, the road-boundary features may be detected by detecting relatively homogenous positive residual flow regions that are separated from areas of low residual flow by elongated lines. These lines are roughly heading in the direction of the focus of expansion (FOE) or the direction of the road (i.e., the direction of the vanishing points of the lane marks).

In an example, bumps or obstacles may be similarly detected directly from the height H or as regions of positive residual flow, at least partially surrounded by areas of low residual flow. In an example, holes or depressions, on the other hand, may be detected as regions of negative residual flow, at least partially surrounded by areas of low residual flow.

In an example, preprocessed (e.g., warped, aligned, and stabilized) images are obtained. These preprocessed images may have been produced as part of road profiling operations, and not specifically for puddle detection. Here, the availability of the preprocessed images facilitates computational efficiency and improved detection speed for feature detection compared to systems having to preprocess the images anew.

Figure 18:
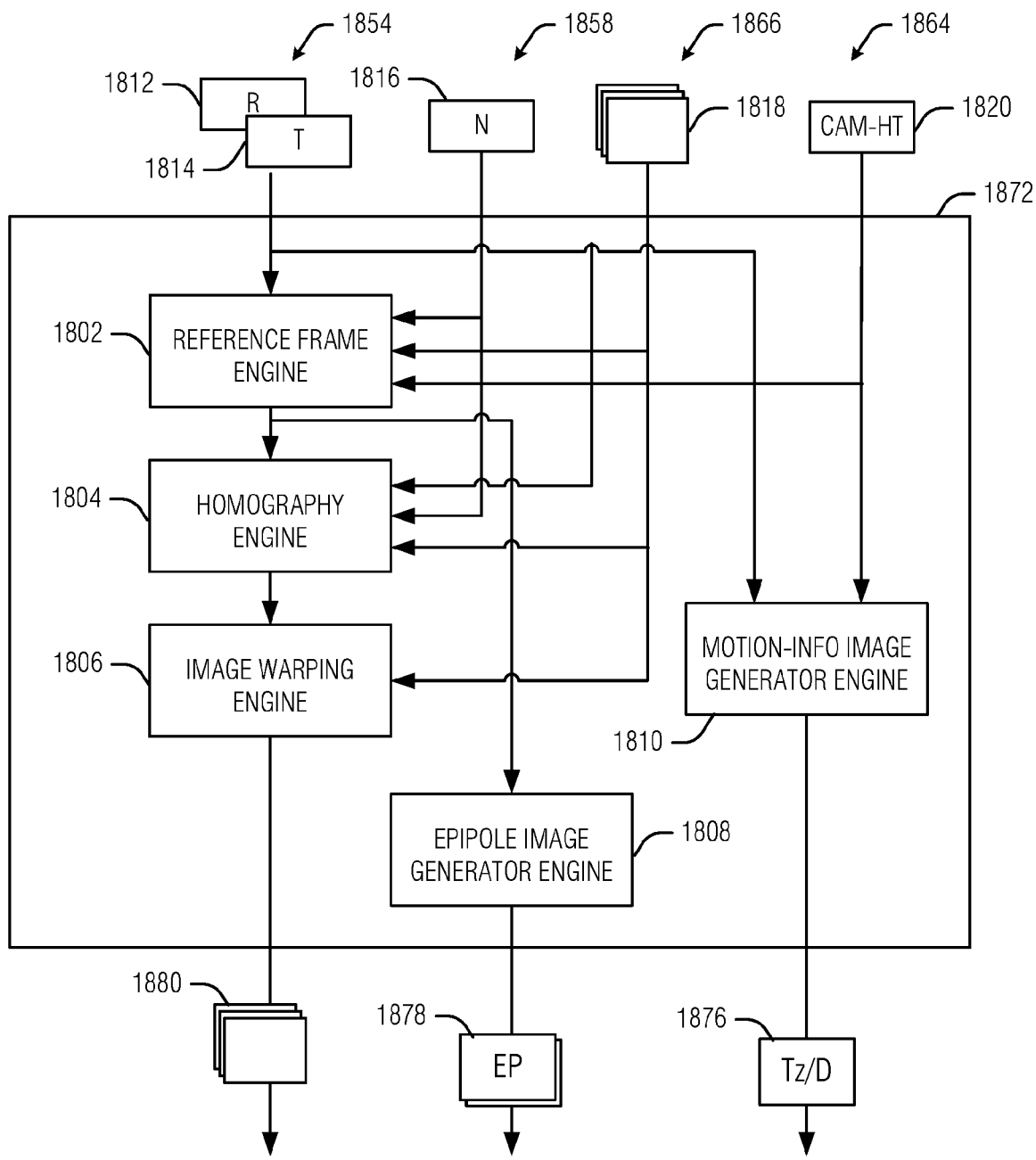
FIG. 18 illustrates an example of a preprocessor engine, according to an embodiment.

FIG. 18 illustrates an example of a preprocessor engine 1872, according to an embodiment. The preprocessor engine 1872 may be an instance of preprocessor engine 1722 from FIG. 17. As depicted, the preprocessor engine 1872 includes a reference frame engine 1802, a homography engine 1804, an image warping engine 1806, an epipole image generator engine 1808, and a motion-information image generator engine 1810.

The EM information 1854 is supplied as an input to the reference frame engine 1802 and to the motion-information image generator engine 1810. In this example, the EM information 1854 includes rotation (R) information 1812 and translation (T) information 1814, which may be provided or derived from motion-sensing devices in the vehicle. The GP information 1858 is provided to the reference frame engine 1802. As depicted, the GP information 1858 includes a default plane normal vector indicator, N 1816 of the road plane.

Captured images 1866 are provided to the reference frame engine 1802, the homography engine 1804, and the image warping engine 1806. The captured images 1866 include a sequence of image frames 1818 (e.g., first image frame A, second image frame B and third image frame C) that are captured from the same portion of road in a field of view. In an example, the sequence of image frames 1818 may have as few as two image frames, three image frames, or more than three image frames.

Camera height information 1864 is provided to the reference frame engine 1802 and the motion information image generator engine 1810. In an example, the camera height information 1864 includes a fixed value 1820 representing the nominal camera height. In an example, the camera height information 1864 includes a dynamic indicator that reports a current camera height, which considers variables such as the suspension state of the vehicle.

In an example, the reference frame engine 1802 is configured to adjust the ground plane indicia from the GP information 1858 to an updated representation of the ground plane, based on the EM information 1854. This may be important when road profile output relative to a stabilized reference plane is desired. As an example, the plane normal vector of the ground plane is adjusted according to:

$$N(t) = \alpha F[N_{(t-1)}, R, T] + \beta N_{curr} + \gamma N_{hist}$$

where N(t) represents the updated plane normal vector, with direction and magnitude information. For example, N(t) may represent plane normal vector N divided by the camera height (i.e., distance to ground plane D, also referred to herein as camH). In an example, N and D may be separately updated using the same α, β, and δ coefficients:

$$(N_{new}; D_{new}) = 0:8\_updated_{R;T}$$

$$(N_{prev}; D_{prev}) + 0:1\_(N_{curr}; D_{cur}) + 0:1\_history(N_{curr}; D_{curr})$$

The homography engine 1804 is configured to compute homographies between pairs of image frames 1818. The term "homography" in the present context refers to an invertible transformation from a projective space to itself that maps straight lines to straight lines. In the field of computer vision, two images of the same planar surface in space are related by a homography (assuming a pinhole camera model). A given homography may be computationally represented and handled as a matrix (realized with an array or other suitable data structure).

As an example, a first homography $H_{AB}$, which represents a transformation of a first image frame, A, of the road to second image frame, B, of the road, is computed by homography engine 1804. The first homography $H_{AB}$ may be computed from matching image points of the road in first image frame A and corresponding set of image points of the road in second image B.

In an example, a homography H may be expressed based on the ego-motion and the ground plane information as:

$$H = K * \left(R - \frac{N * T}{camH}\right) * K^{-1}$$

where R and T respectively represent rotation and translation from the EM 1854 (e.g., from frame A to frame B), camH represents the camera height from camera height information 1864, N represents the plane normal vector from GP 1858, K and $K^{-1}$ represent calibration elements.

A second homography $H_{BC}$, which represents a transformation of the second image frame, B, of the road to third image frame, C, of the road, may also be computed by homography engine 1804 from matching image points on the road in second image frame B and corresponding image points of the road in third image frame C.

The homography engine 1804 may further chain the first and second homographies $H_{AB}$ and $H_{BC}$, such as by matrix multiplication. By using the chained homography as an initial guess, a third homography, $H_{AC}$ may be computed, which represents the transformation of the first image of the road to the third image of the road.

In an example, the homography engine 1804 uses ego-motion between image frames to compute homographies. For instance, rotation measured between the first image frame A and second image frame B, denoted $R_{AB}$, together with translation between first image frame A and second image frame B, $T_{AB}$, are chained with rotation and translation, respectively, between second image frame B and third image frame C, denoted $R_{BC}$ and $T_{BC}$. This ego-motion chaining produces a determination of rotation and translation between the first image frame A and third image frame C, denoted RAC and TAC. The homography engine 1804 uses ego-motion $R_{AB}$ and $T_{AB}$ to update plane normal vector $N_{BC}$, which is the plane normal computed using frames B and C, in the coordinate frame of frame C. It represents a stabilized reference plane common to the second and third image frames B and C. The homography engine 1804 determines an updated plane normal vector (e.g., $N_{BC}$) representing a stabilized reference frame usable for all homographies pertaining to the sequence of three images A, B, and C. Next, the homography engine 1804 composes homography $H_{AC}$ for the transition of image frames between the first image frame A and the third frame C, based on rotation RAC, translation TAC, and plane normal NAC.

In an example, robust tracking after pre-warping is applied to compute a homography. This is used to derive the ego-motion and a plane estimate to adjust the previous plane estimate. The ego-motion and adjusted plane model are combined to obtain the homography. As an example, the ego-motion may be provided by an ego-motion sensor and processing engine. This type of engine uses robust tracking of points on the road and the points above the road using an essential matrix. It also combines any inertial sensors and speedometer information available. The ground plane information is provided by a ground-plane engine. This engine tracks points on the road (after a pre-warp) and then uses the computed ego-motion to derive the depth to each point, which produces the 3D coordinates of the points. Thereafter, a planar surface is algorithmically fit to the 3D points. The ego-motion and planar surface are combined to provide a homography.

In an example, respective parametric models of the road surface may be implemented. For example, a 3D spline model may be provided by a communicatively-coupled driving-path geometry or object-sensing subsystems. As an example of one such subsystem, a Road Experience Management™ (REM™) engine manufactured by Mobileye, a subsidiary of Intel Corporation, may provide representations of road features in the form of 3D splines. For instance, lane marks may be represented as 3D splines. The subsystem aligns 3D-spline feature representations to the images. The 3D spline feature representations may be projected back onto the captured images of the road for further processing.

Each point from the 3D splines has a 3D coordinate. In an example, this data may be used for interpolating and extrapolating the 3D positions associated with the 3D splines along rows of the captured image. Extrapolation to the sides may be zero order hold (i.e. constant), first order hold (e.g., linear extension based on two splines), etc. In an example, the interpolation may occur with the known extension of certain splines to virtual image coordinates that lie outside of the image itself.

The interpolation and extrapolation may produce 3D coordinates for all points in the lower part of the image. These points may be on a smooth 3D surface. In turn, the surface may be used to warp the previous images towards the current image (or vice-versa).

In an example having access to multiple overlapping views (e.g., as described with reference to FIGS. 22 and 23), a homography may be computed by the homography engine 1804 using a combination of the fields of view. For instance, a homography may be obtained from the forward-left field of view 2300A to forward-center field of view 2300B (at time t2) that aligns the overlapping regions of the planar road surface, this homography may be used to warp the image of forward-left field of view 2300C to the image of forward-center field of view 2300B. In addition, a homography may be computed between the image of forward-center field of view 2300B at time t1 to the image of forward-center field of view 2300B and time t2 (as in the monocular case). Further, a homography may be computed from the image of forward-left field of view 2300A (at time t1) to the image of forward-center field of view 2300B (also at time t1). Using this homography, the image of forward-left field of view 2300A (at time t1) may be chain-warped to align with the image of forward-center field of view 2300B (at time t2).

In an example, the homography between the image of forward-left field of view 2300A (at time t1) and the image of forward-center field of view 2300B (also at time t1) is derived from the plane normal used for the homography between the image of forward-center field of view 2300A (at time t1) and the image of forward-center field of view (at time t2) and the known position of forward-left camera 2212A and forward-center camera 2212B (external calibration) together with the internal calibration parameters of each camera such as focal length and lens distortion.

This technique may be used with global-shutter cameras but might introduce errors in the case of rolling shutter cameras, or in the case of non-synchronized cameras. In the latter case, relative position of the two cameras may be derived from the images using 3D points and tracking points between the overlapping road surfaces and computing a homography. Since homographies used for alignment generally use a consistent ground plane, the homography from tracking may be decomposed to give the relative motion, and a new homography may be constructed using this motion and the consistent ground plane normal.

The image warping engine 1806 is configured to perform a warping operation on two of the three image frames 1818. For instance, first image frame A is warped to third image frame C, and second image frame B is warped to third image frame C. In this example, image frame C may represent the current image, with image frame B representing the previous image, and image frame A representing the previous-previous image. The output is warped images 1880.

The epipole image generator engine 1808 is configured to generate the epipole location data 1878 in a format of one or more images. The epipole is a vector that represents the direction of forward motion. In an example, image-formatted epipole location data 1878 includes a pair of images, each image having a resolution that is the same or similar to image frames A, B, and C. The first image of the image pair representing of epipole location data contains "pixels" that represent their respective distances from the epipole along the x axis. The second image of the image pair representing of epipole location data contains "pixels" that represent their respective distances from the epipole along the y axis.

The motion-information image generator engine 1810 is configured to produce the image-formatted motion indicia 1876 representing measured motion of the vehicle. The image-formatted motion indicia 1876 may have the same dimensions as the epipole location data 1878, for example. The content of the image-formatted motion indicia 1876 may include "pixels" having a fixed value representing the vehicle motion. In an example, the vehicle motion in the image-formatted motion indicia 1876 may be based on the EM 1854. In an example, the vehicle motion in the image-formatted motion indicia 1876 is based further on the camera height information 1864. In an example, a ratio of a current measure of translation along the forward (z-axis) direction to the camera height, represented as Tz/D, is provided as a constant value for each "pixel" of the image in the image-formatted data structure 1876.

Figure 19:
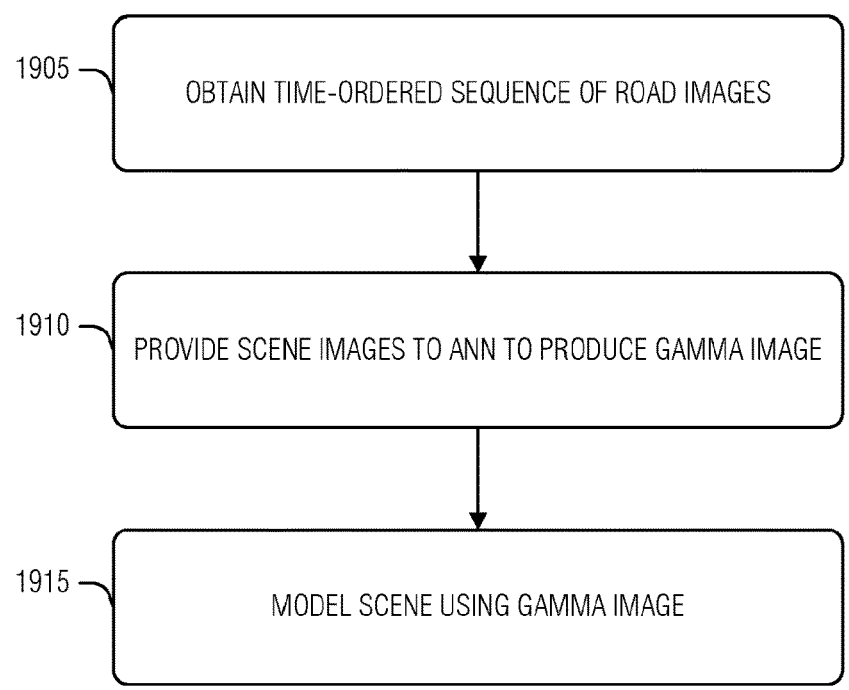
FIG. 19 illustrates a flow diagram of an example of a method for vehicle environment modeling with a camera, according to an embodiment.

FIG. 19 illustrates a flow diagram of an example of a method 1900 for vehicle environment modeling with a camera, according to an embodiment. The operations of the method 1900 are implemented in computational hardware, such as that described above or below (e.g., processing circuitry).

At operation 1905, a time-ordered sequence of images representative of a scene is obtained. Here, one of the sequence of images includes a current image. The images may be captured by a monocular imaging system. In an example, the portion of the sequence of images is three images in total. In an example, the portion of the sequence of images includes images preceding the current image that are separated by one or more images in the sequence of images. In an example, the portion of the sequence of images includes images immediately preceding the current image.

At operation 1910, a data set is provided to an ANN to produce a three-dimensional structure of the scene. In an example, the data set includes a portion of the sequence of images, where the portion of the sequence of images includes the current image and motion of the sensor that captured the images. An epipole may be calculated from the motion of the sensor. An epipole in image format may be input into the ANN.

In an example, the epipole is provided as a gradient image with a same dimensionality as the current image. Here, values of pixels in the gradient image represent a distance from the epipole of pixels in the current image. In an example, a baseline is of at least 0.5 m. In an example, the gradient image is a lower resolution that the current image. In an example, the gradient image represents only horizontal distances from the epipole. In an example, a second gradient image is provided to the ANN to represent vertical distances from the epipole.

In an example, the motion of the sensor is provided as a constant value image with a same dimensionality as the current image. In an example, the constant value is a ratio of forward motion of the sensor by a height of the sensor from the plane.

At operation 1915, the scene is modeling using a gamma image. In an example, the three-dimensional structure of the scene is a gamma image. Here, the gamma image includes pixels with gamma values that are a ratio of a height of a point above a ground plane by a distance from a sensor capturing the current image.

In an example, the ANN is a convolutional neural network (CNN). In an example, the motion of the sensor and the epipole are provided to the CNN at a bottleneck layer.

In an example, a second ANN is invoked using the three-dimensional structure to determine whether an object is moving or not moving within the scene.

In an example, the ANN is trained with an unsupervised training technique in which error is determined by measure a difference between predicted gamma for a location and sensor movement at the location, the sensor movement including pitch, yaw, roll, or translation perpendicular to the ground plane. In an example, the ANN is trained with an unsupervised training technique in which error is determined by measuring a difference between a model of a current image and the current image, the model of the current image produced via a gamma warping of an image captured at the same time as the current image. The current image may be captured by a main camera or image sensor, and the image captured at the same time as the current image may be captured by a left front or right front camera or image sensor. The main, left, and right cameras may be mounted on or in a vehicle.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SOC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SOC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Figure 20:
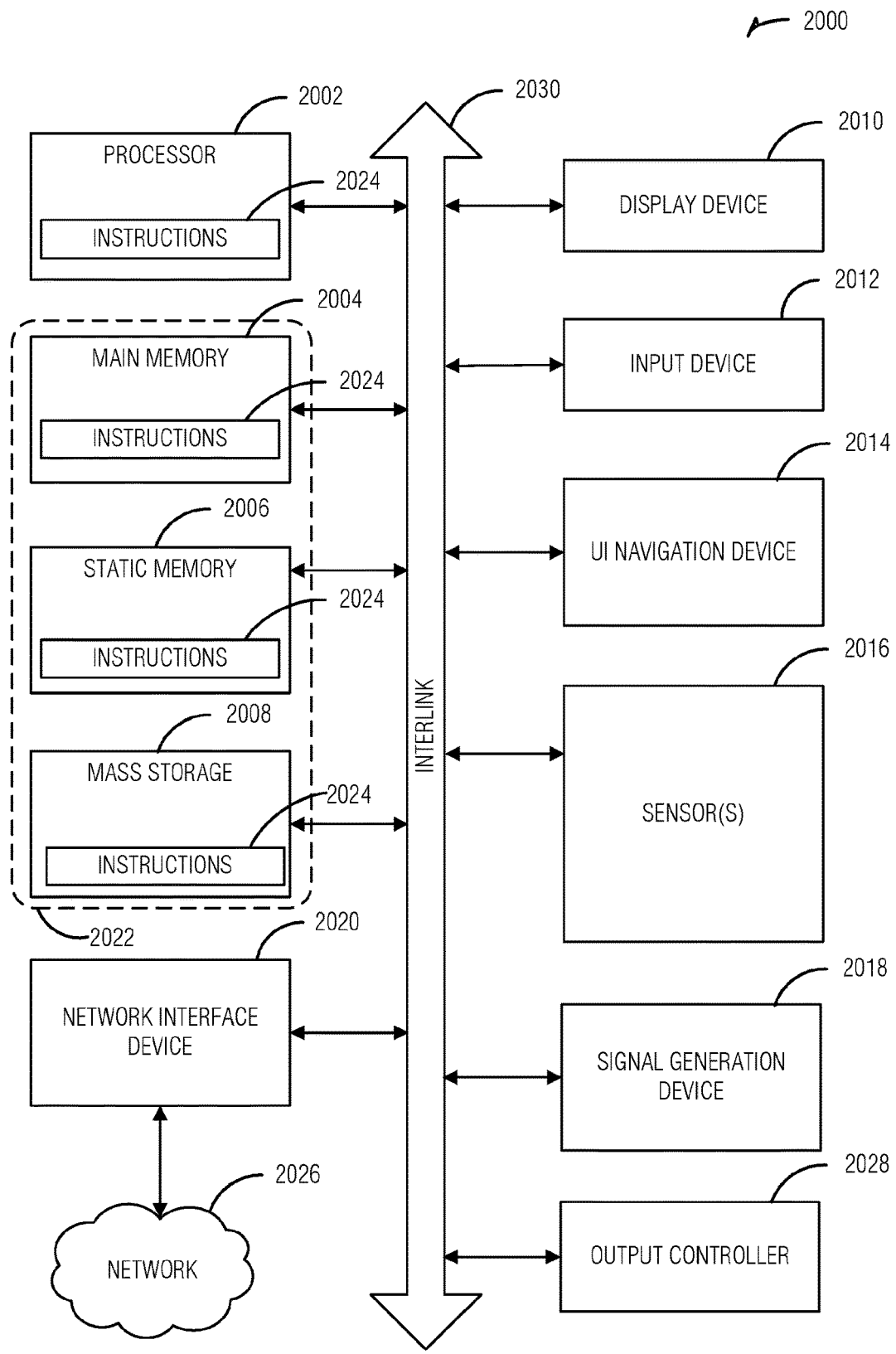
FIG. 20 is a block diagram illustrating an example of a machine upon which one or more embodiments may be implemented.

FIG. 20 illustrates a block diagram of an example machine 2000 upon which any one or more of the techniques (e.g., methodologies) discussed herein may perform. Examples, as described herein, may include, or may operate by, logic or a number of components, or mechanisms in the machine 2000. Circuitry (e.g., processing circuitry) is a collection of circuits implemented in tangible entities of the machine 2000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 2000 follow.

In an example, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 2000 may include a hardware processor 2002 (e.g., a central processing unit (CPU), a graphics processing unit (GPU), a hardware processor core, or any combination thereof), a main memory 2004, a static memory (e.g., memory or storage for firmware, microcode, a basic-input-output (BIOS), unified extensible firmware interface (UEFI), etc.) 2006, and mass storage 2008 (e.g., hard drives, tape drives, flash storage, or other block devices) some or all of which may communicate with each other via interlink (e.g., bus) 2030. The machine 2000 may further include a display unit 2010, an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2000 may additionally include a storage device (e.g., drive unit) 2008, a signal generation device 2018 (e.g., a speaker), a network interface device 2020, and one or more sensors 2016, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 2002, the main memory 2004, the static memory 2006, or the mass storage 2008 may be, or include, a machine readable medium 2022 on which is stored one or more sets of data structures or instructions 2024 (e.g., software) embodying or utilized by any one or more of the techniques or functions described herein. The instructions 2024 may also reside, completely or at least partially, within any of registers of the processor 2002, the main memory 2004, the static memory 2006, or the mass storage 2008 during execution thereof by the machine 2000. In an example, one or any combination of the hardware processor 2002, the main memory 2004, the static memory 2006, or the mass storage 2008 may constitute the machine-readable media 2022. While the machine readable medium 2022 is illustrated as a single medium, the term "machine readable medium" may include a single medium or multiple media (e.g., a centralized or distributed database, and/or associated caches and servers) configured to store the one or more instructions 2024.

The term "machine readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 2022 may be representative of the instructions 2024, such as instructions 2024 themselves or a format from which the instructions 2024 may be derived. This format from which the instructions 2024 may be derived may include source code, encoded instructions (e.g., in compressed or encrypted form), packaged instructions (e.g., split into multiple packages), or the like. The information representative of the instructions 2024 in the machine readable medium 2022 may be processed by processing circuitry into the instructions to implement any of the operations discussed herein. For example, deriving the instructions 2024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 2024.

In an example, the derivation of the instructions 2024 may include assembly, compilation, or interpretation of the information (e.g., by the processing circuitry) to create the instructions 2024 from some intermediate or preprocessed format provided by the machine readable medium 2022. The information, when provided in multiple parts, may be combined, unpacked, and modified to create the instructions 2024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 2024 may be further transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2000, and includes digital or analog communications signals or other intangible medium to facilitate communication of such software. A transmission medium is a machine readable medium.

FIG. 21 is a diagram illustrating an exemplary hardware and software architecture of a computing device in which various interfaces between hardware components and software components are shown. As indicated by HW, hardware components are represented below the divider line, whereas software components denoted by SW reside above the divider line. On the hardware side, processing devices 2102 (which may include one or more microprocessors, digital signal processors, etc., each having one or more processor cores, are interfaced with memory management device 2104 and system interconnect 2106. Memory management device 2104 provides mappings between virtual memory used by processes being executed, and the physical memory. Memory management device 2104 may be an integral part of a central processing unit which also includes the processing devices 2102.

Interconnect 2106 includes a backplane such as memory, data, and control lines, as well as the interface with input/output devices, e.g., PCI, USB, etc. Memory 2108 (e.g., dynamic random access memory—DRAM) and non-volatile memory 2109 such as flash memory (e.g., electrically-erasable read-only memory—EEPROM, NAND Flash, NOR Flash, etc.) are interfaced with memory management device 2104 and interconnect 2106 via memory controller 2110. In an example, this architecture may support direct memory access (DMA) by peripherals. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 2112, which interface with interconnect 2106 via corresponding I/O controllers 2114.

On the software side, a pre-operating system (pre-OS) environment 2116, which is executed at initial system start-up and is responsible for initiating the boot-up of the operating system. One traditional example of pre-OS environment 2116 is a system basic input/output system (BIOS). In present-day systems, a unified extensible firmware interface (UEFI) is implemented. Pre-OS environment 2116, is responsible for initiating the launching of the operating system, but also provides an execution environment for embedded applications according to certain aspects of the invention.

Operating system (OS) 2118 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 2118 provides device drivers, and a variety of common services such as those that facilitate interfacing with peripherals and networking, that provide abstraction for application programs so that the applications do not need to be responsible for handling the details of such common operations. Operating system 2118 additionally provides a graphical user interface (GUI) that facilitates interaction with the user via peripheral devices such as a monitor, keyboard, mouse, microphone, video camera, touchscreen, and the like.

Runtime system 2120 implements portions of an execution model, including such operations as putting parameters onto the stack before a function call, the behavior of disk input/output (I/O), and parallel execution-related behaviors. Runtime system 2120 may also perform support services such as type checking, debugging, or code generation and optimization.

Libraries 2122 include collections of program functions that provide further abstraction for application programs. These include shared libraries, dynamic linked libraries (DLLs), for example. Libraries 2122 may be integral to the operating system 2118, runtime system 2120, or may be added-on features, or even remotely hosted. Libraries 2122 define an application program interface (API) through which a variety of function calls may be made by application programs 2124 to invoke the services provided by the operating system 2118. Application programs 2124 are those programs that perform useful tasks for users, beyond the tasks performed by lower-level system programs that coordinate the basis operability of the computing device itself.

FIG. 22 is a block diagram illustrating processing devices 2202 according to an embodiment. In an example, two or more of processing devices 2202 depicted are formed on a common semiconductor substrate. CPU 2240 may contain one or more processing cores 2242, each of which has one or more arithmetic logic units (ALU), instruction fetch unit, instruction decode unit, control unit, registers, data stack pointer, program counter, and other essential components according to the particular architecture of the processor. As an illustrative example, CPU 2240 may be an x86-type of processor. Processing devices 2202 may also include a graphics processing unit (GPU) 2244. In an example, the GPU 2244 may be a specialized co-processor that offloads certain computationally-intensive operations, particularly those associated with graphics rendering, from CPU 2240. Notably, CPU 2240 and GPU 2244 generally work collaboratively, sharing access to memory resources, I/O channels, etc.

In an example, the processing devices 2202 may also include caretaker processor 2246. Caretaker processor 2246 generally does not participate in the processing work to carry out software code as CPU 2240 and GPU 2244 do. In an example, caretaker processor 2246 does not share memory space with CPU 2240 and GPU 2244, and is therefore not arranged to execute operating system or application programs. Instead, caretaker processor 2246 may execute dedicated firmware that supports the technical workings of CPU 2240, GPU 2244, and other components of the computer system. In an example, caretaker processor is implemented as a microcontroller device, which may be physically present on the same integrated circuit die as CPU 2240, or may be present on a distinct integrated circuit die. Caretaker processor 2246 may also include a dedicated set of I/O facilities to enable it to communicate with external entities. In one type of embodiment, caretaker processor 2246 is implemented using a manageability engine (ME) or platform security processor (PSP). Input/output (I/O) controller 2248 coordinates information flow between the various processing devices 2240, 2244, 2246, as well as with external circuitry, such as a system interconnect.

FIG. 23 is a block diagram illustrating example components of a CPU 2340 according to an embodiment. As depicted, CPU 2340 includes one or more cores 2352, cache 2354, and CPU controller 2356, which coordinates interoperation and tasking of the core(s) 2352, as well as providing an interface to facilitate data flow between the various internal components of CPU 2340, and with external components such as a memory bus or system interconnect. In one embodiment, all of the example components of CPU 2340 are formed on a common semiconductor substrate.

CPU 2340 includes non-volatile memory 2358 (e.g., flash, EEPROM, etc.) for storing certain portions of foundational code, such as an initialization engine, and microcode. Also, CPU 2340 may be interfaced with an external (e.g., formed on a separate IC) non-volatile memory device 2360 that stores foundational code that is launched by the initialization engine, such as system BIOS or UEFI code.

Additional Notes & Examples

Example 1 is a device for modeling a scene, the device comprising: a hardware interface to obtain a time-ordered sequence of images representative of a scene, the time-ordered sequence including a plurality of images, one of the sequence of images being a current image, the scene captured by a monocular imaging system; and processing circuitry to: provide a data set to an artificial neural network (ANN) to produce a three-dimensional structure of the scene, the data set including: a portion of the sequence of images, the portion of the sequence of images including the current image; and motion of a sensor that captured the sequence of images; and model the scene using the three-dimensional structure of the scene, wherein the three-dimensional structure is determined for both moving and fixed objects in the scene.

In Example 2, the subject matter of Example 1 includes, wherein an epipole is derived from the motion of the sensor that captured the sequence of images, and wherein the epipole is provided as a gradient image with a same dimensionality as the current image, and values of pixels in the gradient image represent a distance from the epipole of pixels in the current image.

In Example 3, the subject matter of Example 2 includes, wherein the gradient image represents only horizontal distances from the epipole, and wherein a second gradient image is provided to the ANN to represent vertical distances from the epipole.

In Example 4, the subject matter of Examples 1-3 includes, wherein an epipole is derived from the motion of the sensor that captured the sequence of images, and wherein the epipole is provided as a gradient image to a layer of the ANN, and wherein a dimensionality of the epipole matches the layer of the ANN.

In Example 5, the subject matter of Examples 1-4 includes, wherein the motion of the sensor is provided as a constant value image with a same dimensionality as the current image.

In Example 6, the subject matter of Example 5 includes, wherein the constant value is a ratio of forward motion of the sensor by a height of the sensor from the plane.

In Example 7, the subject matter of Examples 1-6 includes, wherein the motion of the sensor is provided as a constant value image to a layer of the ANN, and wherein a dimensionality of the constant value image matches the layer of the ANN.

In Example 8, the subject matter of Examples 1-7 includes, wherein the processing circuitry is configured to invoke a second ANN using the three-dimensional structure to determine whether an object is moving or not moving within the scene.

In Example 9, the subject matter of Examples 1-8 includes, wherein the ANN is trained with an unsupervised training technique in which error is determined by measuring a difference between a model of a current image and the current image, the model of the current image produced via a gamma warping of an image captured at the same time as the current image.

In Example 10, the subject matter of Example 9 includes, wherein the model of the current image is based on a plurality of images captured by a stereo imaging system, the stereo imaging system independent from the monocular imaging system.

In Example 11, the subject matter of Example 10 includes, wherein the stereo imaging system includes a first image sensor and a second image sensor, the first and second image sensors having overlapping fields of view with each other.

In Example 12, the subject matter of Example 11 includes, wherein the first image sensor and the second image sensor implement rolling shutters.

In Example 13, the subject matter of Examples 1-12 includes, wherein the monocular imaging system uses a rolling shutter camera.

Example 14 is a method for modeling a scene, the method comprising: obtaining a time-ordered sequence of images representative of a scene, the time-ordered sequence including a plurality of images, one of the sequence of images being a current image, the scene captured by a monocular imaging system; providing a data set to an artificial neural network (ANN) to produce a three-dimensional structure of the scene, the data set including: a portion of the sequence of images, the portion of the sequence of images including the current image; and motion of a sensor that captured the sequence of images; and modeling the scene using the three-dimensional structure of the scene, wherein the three-dimensional structure is determined for both moving and fixed objects in the scene.

In Example 15, the subject matter of Example 14 includes, wherein an epipole is derived from the motion of the sensor that captured the sequence of images, and wherein the epipole is provided as a gradient image with a same dimensionality as the current image, and values of pixels in the gradient image represent a distance from the epipole of pixels in the current image.

In Example 16, the subject matter of Example 15 includes, wherein the gradient image represents only horizontal distances from the epipole, and wherein a second gradient image is provided to the ANN to represent vertical distances from the epipole.

In Example 17, the subject matter of Examples 14-16 includes, wherein an epipole is derived from the motion of the sensor that captured the sequence of images, and wherein the epipole is provided as a gradient image to a layer of the ANN, and wherein a dimensionality of the epipole matches the layer of the ANN.

In Example 18, the subject matter of Examples 14-17 includes, wherein the motion of the sensor is provided as a constant value image with a same dimensionality as the current image.

In Example 19, the subject matter of Example 18 includes, wherein the constant value is a ratio of forward motion of the sensor by a height of the sensor from the plane.

In Example 20, the subject matter of Examples 14-19 includes, wherein the motion of the sensor is provided as a constant value image to a layer of the ANN, and wherein a dimensionality of the constant value image matches the layer of the ANN.

In Example 21, the subject matter of Examples 14-20 includes, invoking a second ANN using the three-dimensional structure to determine whether an object is moving or not moving within the scene.

In Example 22, the subject matter of Examples 14-21 includes, wherein the ANN is trained with an unsupervised training technique in which error is determined by measuring a difference between a model of a current image and the current image, the model of the current image produced via a gamma warping of an image captured at the same time as the current image.

In Example 23, the subject matter of Example 22 includes, wherein the model of the current image is based on a plurality of images captured by a stereo imaging system, the stereo imaging system independent from the monocular imaging system.

In Example 24, the subject matter of Example 23 includes, wherein the stereo imaging system includes a first image sensor and a second image sensor, the first and second image sensors having overlapping fields of view with each other.

In Example 25, the subject matter of Example 24 includes, wherein the first image sensor and the second image sensor implement rolling shutters.

In Example 26, the subject matter of Examples 14-25 includes, wherein the monocular imaging system uses a rolling shutter camera.

Example 27 is at least one machine-readable medium including instructions for modeling a scene, the instructions, which when executed a machine cause the machine to perform operations comprising: obtaining a time-ordered sequence of images representative of a scene, the time-ordered sequence including a plurality of images, one of the sequence of images being a current image, the scene captured by a monocular imaging system; providing a data set to an artificial neural network (ANN) to produce a three-dimensional structure of the scene, the data set including: a portion of the sequence of images, the portion of the sequence of images including the current image; and motion of a sensor that captured the sequence of images; and modeling the scene using the three-dimensional structure of the scene, wherein the three-dimensional structure is determined for both moving and fixed objects in the scene.

In Example 28, the subject matter of Example 27 includes, wherein an epipole is derived from the motion of the sensor that captured the sequence of images, and wherein the epipole is provided as a gradient image with a same dimensionality as the current image, and values of pixels in the gradient image represent a distance from the epipole of pixels in the current image.

In Example 29, the subject matter of Example 28 includes, wherein the gradient image represents only horizontal distances from the epipole, and wherein a second gradient image is provided to the ANN to represent vertical distances from the epipole.

In Example 30, the subject matter of Examples 27-29 includes, wherein an epipole is derived from the motion of the sensor that captured the sequence of images, and wherein the epipole is provided as a gradient image to a layer of the ANN, and wherein a dimensionality of the epipole matches the layer of the ANN.

In Example 31, the subject matter of Examples 27-30 includes, wherein the motion of the sensor is provided as a constant value image with a same dimensionality as the current image.

In Example 32, the subject matter of Example 31 includes, wherein the constant value is a ratio of forward motion of the sensor by a height of the sensor from the plane.

In Example 33, the subject matter of Examples 27-32 includes, wherein the motion of the sensor is provided as a constant value image to a layer of the ANN, and wherein a dimensionality of the constant value image matches the layer of the ANN.

In Example 34, the subject matter of Examples 27-33 includes, invoking a second ANN using the three-dimensional structure to determine whether an object is moving or not moving within the scene.

In Example 35, the subject matter of Examples 27-34 includes, wherein the ANN is trained with an unsupervised training technique in which error is determined by measuring a difference between a model of a current image and the current image, the model of the current image produced via a gamma warping of an image captured at the same time as the current image.

In Example 36, the subject matter of Example 35 includes, wherein the model of the current image is based on a plurality of images captured by a stereo imaging system, the stereo imaging system independent from the monocular imaging system.

In Example 37, the subject matter of Example 36 includes, wherein the stereo imaging system includes a first image sensor and a second image sensor, the first and second image sensors having overlapping fields of view with each other.

In Example 38, the subject matter of Example 37 includes, wherein the first image sensor and the second image sensor implement rolling shutters.

In Example 39, the subject matter of Examples 27-38 includes, wherein the monocular imaging system uses a rolling shutter camera.

Example 40 is an apparatus for modeling a scene, comprising: means for obtaining a time-ordered sequence of images representative of a scene, the time-ordered sequence including a plurality of images, one of the sequence of images being a current image, the scene captured by a monocular imaging system; means for providing a data set to an artificial neural network (ANN) to produce a three-dimensional structure of the scene, the data set including: a portion of the sequence of images, the portion of the sequence of images including the current image; and motion of a sensor that captured the sequence of images; and means for modeling the scene using the three-dimensional structure of the scene, wherein the three-dimensional structure is determined for both moving and fixed objects in the scene.

In Example 41, the subject matter of Example 40 includes, wherein an epipole is derived from the motion of the sensor that captured the sequence of images, and wherein the epipole is provided as a gradient image with a same dimensionality as the current image, and values of pixels in the gradient image represent a distance from the epipole of pixels in the current image.

In Example 42, the subject matter of Example 41 includes, wherein the gradient image represents only horizontal distances from the epipole, and wherein a second gradient image is provided to the ANN to represent vertical distances from the epipole.

In Example 43, the subject matter of Examples 40-42 includes, wherein an epipole is derived from the motion of the sensor that captured the sequence of images, and wherein the epipole is provided as a gradient image to a layer of the ANN, and wherein a dimensionality of the epipole matches the layer of the ANN.

In Example 44, the subject matter of Examples 40-43 includes, wherein the motion of the sensor is provided as a constant value image with a same dimensionality as the current image.

In Example 45, the subject matter of Example 44 includes, wherein the constant value is a ratio of forward motion of the sensor by a height of the sensor from the plane.

In Example 46, the subject matter of Examples 40-45 includes, wherein the motion of the sensor is provided as a constant value image to a layer of the ANN, and wherein a dimensionality of the constant value image matches the layer of the ANN.

In Example 47, the subject matter of Examples 40-46 includes, means for invoking a second ANN using the three-dimensional structure to determine whether an object is moving or not moving within the scene.

In Example 48, the subject matter of Examples 40-47 includes, wherein the ANN is trained with an unsupervised training technique in which error is determined by measuring a difference between a model of a current image and the current image, the model of the current image produced via a gamma warping of an image captured at the same time as the current image.

In Example 49, the subject matter of Example 48 includes, wherein the model of the current image is based on a plurality of images captured by a stereo imaging system, the stereo imaging system independent from the monocular imaging system.

In Example 50, the subject matter of Example 49 includes, wherein the stereo imaging system includes a first image sensor and a second image sensor, the first and second image sensors having overlapping fields of view with each other.

In Example 51, the subject matter of Example 50 includes, wherein the first image sensor and the second image sensor implement rolling shutters.

In Example 52, the subject matter of Examples 40-51 includes, wherein the monocular imaging system uses a rolling shutter camera.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device for modeling a scene, the device comprising:
a hardware interface to obtain a time-ordered sequence of images representative of a scene, the time-ordered sequence including a plurality of images, one of the sequence of images being a current image, the scene captured by a monocular imaging system; and
processing circuitry to:
provide a data set to an artificial neural network (ANN) to produce a three-dimensional structure of the scene, the data set including:

a portion of the sequence of images, the portion of the sequence of images including the current image; and motion of a sensor that captured the sequence of images, wherein the motion of the sensor is provided as a constant value image; and model the scene using the three-dimensional structure of the scene, wherein the three-dimensional structure is determined for both moving and fixed objects in the scene.

2. The device of claim 1, wherein an epipole is derived from the motion of the sensor that captured the sequence of images, and wherein the epipole is provided as a gradient image with a same dimensionality as the current image, and values of pixels in the gradient image represent a distance from the epipole of pixels in the current image.

3. The device of claim 2, wherein the gradient image represents only horizontal distances from the epipole, and wherein a second gradient image is provided to the ANN to represent vertical distances from the epipole.

4. The device of claim 1, wherein an epipole is derived from the motion of the sensor that captured the sequence of images, and wherein the epipole is provided as a gradient image to a layer of the ANN, and wherein a dimensionality of the epipole matches the layer of the ANN.

5. The device of claim 1, wherein the constant value image has a same dimensionality as the current image.

6. The device of claim 5, wherein the constant value image has a value in each pixel that is a ratio of forward motion of the sensor by a height of the sensor from a plane.

7. The device of claim 1, wherein the constant value image is provided to a layer of the ANN, and wherein a dimensionality of the constant value image matches the layer of the ANN.

8. The device of claim 1, wherein the processing circuitry is configured to invoke a second ANN using the three-dimensional structure to determine whether an object is moving or not moving within the scene.

9. The device of claim 1, wherein the ANN is trained with an unsupervised training technique in which error is determined by measuring a difference between a model of a current image and the current image, the model of the current image produced via a gamma warping of an image captured at the same time as the current image.

10. The device of claim 9, wherein the model of the current image is based on a plurality of images captured by a stereo imaging system, the stereo imaging system independent from the monocular imaging system.

11. The device of claim 10, wherein the stereo imaging system includes a first image sensor and a second image sensor, the first and second image sensors having overlapping fields of view with each other.

12. The device of claim 11, wherein the first image sensor and the second image sensor implement rolling shutters.

13. The device of claim 1, wherein the monocular imaging system uses a rolling shutter camera.

14. A method for modeling a scene, the method comprising:

obtaining a time-ordered sequence of images representative of a scene, the time-ordered sequence including a plurality of images, one of the sequence of images being a current image, the scene captured by a monocular imaging system;

providing a data set to an artificial neural network (ANN) to produce a three-dimensional structure of the scene, the data set including:

a portion of the sequence of images, the portion of the sequence of images including the current image; and motion of a sensor that captured the sequence of images, wherein the motion of the sensor is provided as a constant value image; and modeling the scene using the three-dimensional structure of the scene, wherein the three-dimensional structure is determined for both moving and fixed objects in the scene.

15. The method of claim 14, wherein an epipole is derived from the motion of the sensor that captured the sequence of images, and wherein the epipole is provided as a gradient image with a same dimensionality as the current image, and values of pixels in the gradient image represent a distance from the epipole of pixels in the current image.

16. The method of claim 15, wherein the gradient image represents only horizontal distances from the epipole, and wherein a second gradient image is provided to the ANN to represent vertical distances from the epipole.

17. The method of claim 14, wherein an epipole is derived from the motion of the sensor that captured the sequence of images, and wherein the epipole is provided as a gradient image to a layer of the ANN, and wherein a dimensionality of the epipole matches the layer of the ANN.

18. The method of claim 14, wherein the constant value image has a same dimensionality as the current image.

19. The method of claim 18, wherein the constant value image has a value in each pixel that is a ratio of forward motion of the sensor by a height of the sensor from a plane.

20. The method of claim 14, wherein the constant value image is provided to a layer of the ANN, and wherein a dimensionality of the constant value image matches the layer of the ANN.

21. The method of claim 14, comprising invoking a second ANN using the three-dimensional structure to determine whether an object is moving or not moving within the scene.

22. The method of claim 14, wherein the ANN is trained with an unsupervised training technique in which error is determined by measuring a difference between a model of a current image and the current image, the model of the current image produced via a gamma warping of an image captured at the same time as the current image.

23. The method of claim 22, wherein the model of the current image is based on a plurality of images captured by a stereo imaging system, the stereo imaging system independent from the monocular imaging system.

24. The method of claim 23, wherein the stereo imaging system includes a first image sensor and a second image sensor, the first and second image sensors having overlapping fields of view with each other.

25. The method of claim 24, wherein the first image sensor and the second image sensor implement rolling shutters.

26. The method of claim 14, wherein the monocular imaging system uses a rolling shutter camera.

* * * * *